(12) United States Patent
Fuchs

(10) Patent No.: US 11,157,973 B2
(45) Date of Patent: Oct. 26, 2021

(54) SYSTEM AND METHOD FOR ESTIMATION OF VEHICLE ACCIDENT DAMAGE AND REPAIR

(71) Applicant: Scope Technologies Holdings Limited, Tortola (VG)

(72) Inventor: Gil Emanuel Fuchs, Nes Tziona (IL)

(73) Assignee: Scope Technologies Holdings Limited, Road Town Tortola (VG)

( * ) Notice: Subject to any disclaimer, the term of this patent is extended or adjusted under 35 U.S.C. 154(b) by 688 days.

(21) Appl. No.: 14/517,543

(22) Filed: Oct. 17, 2014

(65) Prior Publication Data
US 2015/0039397 A1    Feb. 5, 2015

Related U.S. Application Data

(63) Continuation-in-part of application No. PCT/IB2014/001656, filed on Jun. 27, 2014.
(Continued)

(51) Int. Cl.
*G06Q 40/08* (2012.01)
*G06Q 40/02* (2012.01)
(Continued)

(52) U.S. Cl.
CPC ......... *G06Q 30/0283* (2013.01); *G07C 5/008* (2013.01); *G07C 5/085* (2013.01)

(58) Field of Classification Search
CPC ........ G06Q 40/08; G06Q 40/02; G06Q 30/02; G07C 5/08
(Continued)

(56) References Cited

U.S. PATENT DOCUMENTS 4,638,289 A    1/1987 Zottnik
4,758,959 A    7/1988 Thoone et al.
(Continued)

FOREIGN PATENT DOCUMENTS

CN    102436738 A    5/2012
EP    0466499 A1    1/1992
(Continued)

OTHER PUBLICATIONS

McCormack, Edward, Year: 2009,Source: ITE Journal, vol. 79, No. 12, pp. 32-36,Publisher: Institute of Transportation Engineers.
(Continued)

*Primary Examiner* — Nga B Nguyen
(74) *Attorney, Agent, or Firm* — Downs Rachlin Martin PLLC

(57) ABSTRACT

Described herein is a system and method for predicting the extent and cost of repair resulting from a vehicle accident. The estimates can be based on one or more of in-vehicle sensor measurements during the accident, external observations such as weather and traffic and road conditions and manually or digitally input accident reports. The gathered information is compared to information in a database from historical accidents and the resulting damage and costs for those. The information is classified according to impact force, direction and location along with the specific type of vehicle. Maintaining and refreshing the information and predictive models in the system is also part of the invention.

33 Claims, 14 Drawing Sheets

Related U.S. Application Data

(60) Provisional application No. 61/846,203, filed on Jul. 15, 2013, provisional application No. 61/840,383, filed on Jun. 27, 2013.

(51) Int. Cl.
  *G06Q 30/02* (2012.01)
  *G07C 5/00* (2006.01)
  *G07C 5/08* (2006.01)

(58) Field of Classification Search
  USPC ........................................................ 705/7.35
  See application file for complete search history.

(56) References Cited

U.S. PATENT DOCUMENTS

| | | | |
|---|---|---|---|
| 6,282,496 B1 | 8/2001 | Chowdhary | |
| 7,643,960 B2 | 1/2010 | Tan et al. | |
| 7,653,507 B2 | 1/2010 | Yamada et al. | |
| 7,715,961 B1 | 5/2010 | Kargupta | |
| 7,761,544 B2 | 7/2010 | Manasseh et al. | |
| 8,065,104 B2 | 11/2011 | Fielder et al. | |
| 8,140,358 B1* | 3/2012 | Ling | G07C 5/008 705/4 |
| 8,229,624 B2 | 7/2012 | Breed | |
| 8,444,082 B1 | 5/2013 | Foch | |
| 8,510,196 B1* | 8/2013 | Brandmaier | G06Q 40/08 705/35 |
| 8,595,034 B2 | 11/2013 | Bauer et al. | |
| 8,799,034 B1* | 8/2014 | Brandmaier | G06Q 40/08 705/4 |
| 8,825,277 B2 | 9/2014 | McClellan et al. | |
| 8,930,044 B1 | 1/2015 | Peeters et al. | |
| 9,020,751 B1 | 4/2015 | Bogovich et al. | |
| 9,081,650 B1* | 7/2015 | Brinkmann | G07C 5/0808 |
| 9,104,535 B1* | 8/2015 | Brinkmann | G08G 1/0112 |
| 9,141,582 B1* | 9/2015 | Brinkmann | G07C 5/0808 |
| 9,141,995 B1* | 9/2015 | Brinkmann | G07C 5/02 |
| 9,524,269 B1* | 12/2016 | Brinkmann | G07C 5/0808 |
| 9,535,878 B1* | 1/2017 | Brinkmann | G06F 17/00 |
| 2002/0041240 A1* | 4/2002 | Ikeda | G08B 25/016 340/993 |
| 2002/0111725 A1 | 8/2002 | Burge | |
| 2003/0095038 A1 | 5/2003 | Dix | |
| 2003/0187704 A1* | 10/2003 | Hashiguchi | G06Q 40/02 705/4 |
| 2004/0103010 A1* | 5/2004 | Wahlbin | G06Q 40/08 705/4 |
| 2004/0153362 A1 | 8/2004 | Bauer et al. | |
| 2005/0046584 A1 | 3/2005 | Breed | |
| 2005/0116829 A1 | 6/2005 | Koenig et al. | |
| 2005/0131597 A1 | 6/2005 | Raz | |
| 2006/0092043 A1 | 5/2006 | Lagassey | |
| 2006/0092890 A1 | 5/2006 | Gupta et al. | |
| 2006/0241853 A1 | 10/2006 | Gadler | |
| 2007/0061109 A1* | 3/2007 | Wilke | G06Q 10/10 702/183 |
| 2007/0061155 A1 | 3/2007 | Ji et al. | |
| 2007/0159309 A1 | 7/2007 | Ito et al. | |
| 2008/0157940 A1 | 7/2008 | Breed et al. | |
| 2008/0255887 A1* | 10/2008 | Gruter | G06Q 40/08 705/4 |
| 2008/0262670 A1 | 10/2008 | McClellan et al. | |
| 2009/0210257 A1 | 8/2009 | Chalfant et al. | |
| 2009/0228172 A1* | 9/2009 | Markyvech | G01S 5/0072 701/36 |
| 2010/0063850 A1 | 3/2010 | Daniel | |
| 2010/0131304 A1 | 5/2010 | Collopy | |
| 2010/0238009 A1 | 9/2010 | Cook et al. | |
| 2010/0305805 A1 | 12/2010 | Yamaguchi | |
| 2011/0046842 A1 | 2/2011 | Smith | |
| 2011/0106370 A1 | 5/2011 | Duddle | |
| 2011/0147513 A1 | 6/2011 | Surmont | |
| 2011/0202305 A1 | 8/2011 | Willis et al. | |
| 2011/0213628 A1* | 9/2011 | Peak | G06Q 40/08 705/4 |
| 2011/0307188 A1 | 12/2011 | Peng et al. | |
| 2011/0313650 A1 | 12/2011 | Tome | |
| 2012/0010906 A1 | 1/2012 | Foladare et al. | |
| 2012/0018989 A1 | 1/2012 | Breed | |
| 2012/0072244 A1 | 3/2012 | Collins et al. | |
| 2012/0076437 A1 | 3/2012 | King | |
| 2012/0078472 A1 | 3/2012 | Neal et al. | |
| 2012/0089299 A1 | 4/2012 | Breed | |
| 2012/0123806 A1 | 5/2012 | Schumann, Jr. et al. | |
| 2012/0166035 A1 | 5/2012 | Schumann, Jr. et al. | |
| 2012/0173444 A1 | 7/2012 | Zik | |
| 2012/0232787 A1 | 9/2012 | Kunath et al. | |
| 2012/0297337 A1* | 11/2012 | St. Denis | G08G 1/168 715/810 |
| 2013/0040599 A1 | 2/2013 | Berg et al. | |
| 2013/0041521 A1 | 2/2013 | Basir et al. | |
| 2013/0046562 A1 | 2/2013 | Taylor et al. | |
| 2013/0060583 A1 | 3/2013 | Collin et al. | |
| 2013/0141249 A1* | 6/2013 | Pearlman | G09B 19/14 340/870.03 |
| 2013/0144474 A1 | 6/2013 | Ricci | |
| 2013/0244210 A1* | 9/2013 | Nath | G07C 5/008 434/65 |
| 2013/0317862 A1* | 11/2013 | Fernandes | G08G 5/0039 705/4 |
| 2014/0009307 A1* | 1/2014 | Bowers | G08G 1/161 340/901 |
| 2014/0012492 A1* | 1/2014 | Bowers | G08G 1/16 701/301 |
| 2014/0019167 A1* | 1/2014 | Cheng | G06Q 40/08 705/4 |
| 2014/0279707 A1 | 9/2014 | Joshua et al. | |
| 2014/0297058 A1 | 10/2014 | Barker et al. | |
| 2014/0358326 A1 | 12/2014 | Phelan et al. | |
| 2014/0358362 A1 | 12/2014 | Breed | |
| 2015/0312655 A1 | 10/2015 | Balakrishnan et al. | |
| 2020/0299017 A1 | 9/2020 | Pegoraro et al. | |

FOREIGN PATENT DOCUMENTS

| | | |
|---|---|---|
| GB | 2488956 B | 8/2013 |
| WO | 2011003461 A1 | 1/2011 |
| WO | 2014080388 A2 | 5/2014 |
| WO | 2014159127 A1 | 10/2014 |

OTHER PUBLICATIONS

Mimbela, Luz Elena Y., et al, Summary of Vehicle Detection and Surveilnace Technologies Used in Intelligent Transportation Systems, 2000, Published by the Vehicle Detector Clearinghouse,Southwest Technology Development Institute (SWTDI), see https://www.fhwa.dot.gov/ohim/tvtw/vdstits.pdf.

Padmavathi, D. et al, A Study on Vehicle Detection and Tracking Using Wireless Sensor Networks, in Wireless Sensor Network, Feb. 2010, vol. 2, pp. 173-185.

Publication No. FHWA-HRT-14-037 | Nov. 2013, Federal Highway Administration.

Copernheaver, Blaine, PCT International Search Report for PCTUS2016/015514, dated Jun. 20, 2016.

ISR Report for PCT/US2012/071487.

Prelim Report on Patentability for PCT/US/12/71487.

Extended Internation Search Report for PCT/US2012071487.

Internation Search Report for PCT/US2012/071487.

Preliminary Report on Patentability for PCT/US12/71487.

\* cited by examiner

SYSTEM AND METHOD FOR ESTIMATION OF VEHICLE ACCIDENT DAMAGE AND REPAIR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is a related to international application PCT/IB2014/001656 titled "ONBOARD VEHICLE ACCIDENT DETECTION AND DAMAGE ESTIMATION SYSTEM AND METHOD OF USE", filed on 27 Jun. 2014 and is herein incorporated by reference. PCT/IB2014/001656 claims the benefit of priority to both U.S. Provisional Application No. 61/840,383 titled "SYSTEM AND METHOD FOR DETERMINATION OF VEHICLE ACCIDENT INFORMATION" filed on 27 Jun. 2013 and U.S. Provisional Application No. 61/846,203 tilted "SYSTEM AND METHOD FOR DETERMINATION OF VEHICLE ACCIDENT INFORMATION" filed on 15 Jul. 2013 both of which are herein incorporated by reference. The present application is also related to U.S. Patent Application titled "SYSTEM AND METHOD FOR USE OF PATTERN RECOGNITION IN ASSESSING OR MONITORING VEHICLE STATUS OR OPERATOR DRIVING BEHAVIOR", application Ser. No. 13/679,722, filed Nov. 16, 2012; which claims the benefit of priority to U.S. Provisional Patent Application No. 61/578,511, filed Dec. 21, 2011; each of which above applications are herein incorporated by reference.

FIELD OF INVENTION

Embodiments of the invention are generally related to systems and methods to rapidly assess a vehicle accident and produce an estimate of damage and cost of repair. In an embodiment, the system monitors in-vehicle sensor output acquired during an accident, then compares that output with a database of information on previous similar accidents to estimate damage and amount of repair work that may be needed. In other embodiments, the estimate is transmitted to the accident scene in near real-time either to the vehicle or to an insurance adjustor or other authorized party carrying a mobile device.

BACKGROUND

Standard methods of dealing with repairing damage due to an vehicle accident consist of:
Visually assessing the damage,
Estimating the cost of repairs based on prior experience of the assessor
Finding a repair facility and a time when they can do the work
Current state of the art is to perform these tasks manually which is time consuming and requires input from several individuals including an insurance adjuster, one or more estimators from a body shop, a searcher for replacement parts, work on the part of the driver or the insured in negotiating an insurance settlement and the list goes on.

It may also be necessary, for insurance purposes, to assign blame so that the insurance of the responsible party is charged. This is typically done by interviewing participants in the accident and/or witnesses of the accident. It can also, in part, be done by examining the damage to the two vehicles to facilitate learning who hit who.

There is a need to detect when and where a vehicle accident occurs and to accurately assess the damage and loss as well as injury associated with an accident immediately following the accident. Systems in the art require two-way communications with a central server to get information required to do an accurate assessment of damage and to facilitate remedial action. By having all the pertinent information needed to assess damage and effect repair in-vehicle, issues requiring uninterrupted wireless communication can be avoided. Should long-range wireless communication be impeded, immediate information is available to on-site interested parties via short-range wireless communication, wired communication, visual display or physically removing memory that contains event data and analysis. By having all pertinent information in-vehicle, accident analysis can be performed locally without the need of any communication. This information can then be relayed digitally (in standard formats) or manually if necessary to interested parties. This information can then be transmitted to, for example, to insurance carriers for the vehicle, emergency responders, service technicians, and towing and parts providers when and if long-range wireless communications is available.

A large amount of data is necessary to accurately and rapidly assess the damage resulting from a vehicle accident. Parts of these data may be specific to both the vehicle, location, and driver of the vehicle. To make pertinent vehicle information available within the vehicle, part of this invention is the methodology to parse and download that pertinent information periodically to the vehicle.

Methods exist to collect vehicle sensor information and to transmit that information to a central server for use in an insurance claim, but no comprehensive in-vehicle system and database exists that facilitates accident detection and rapid and accurate damage assessment and/or facilitate immediate claim processing and repair scheduling.

There is a need in the automotive insurance industry to accurately predict the risk of claims being made and the costliness of claims being made and adjusting the insurance rate charged to an individual accordingly so that the individual is paying their appropriate premium based on the risk attributed to the individual. The more accurate the prediction, the lower the premiums can become, making the insurer more competitive and presumably profitable, and/or the insurer may choose to not insure those individuals of the perceived greatest risk or smallest profit potential.

It is known in the art to base premiums on such thing as the geographic area where a driver lives, or potentially the area s/he drives through on a regular basis. It is also known to further evaluate rates based on the historical location and frequency of accidents, crime rates, traffic flow and/or claims made in the vicinity of geographic area used as a rating territory. It is further known to adjust the rates based on the driver's past driving history.

One of the many problems with existing insurance risk rating systems is that they are too granular or non-specific. For example, typically a geographic area for rating would be based on the address of the owner of the vehicle. This would mean that all the residents of a given area or neighborhood would be lumped into the same rate category. These rates could be adjusted for factors such as the type of car being insured on how expensive claims are for that particular type of car in the area of interest, however this type of rating system generally does not take into account the areas typically driven through on a regular basis by the driver.

Another issue with current insurance risk rating systems is that assumptions made in the systems may not be valid. For example, most would agree that if a person obeys the traffic laws, then that person's driving risk would be less. This may not be the case and the embodiments of the present invention make no such assumptions.

There is a need in the industry to have a vehicle insurance risk system based on one or several parameters that are spatially referenced with respect to the transportation network the vehicles travel on and further based on the driving habits of individual drivers that are insured or desire insurance.

SUMMARY

In an embodiment of this invention, it is an object to perform a rapid assessment of damage and needed repair resulting from a vehicle accident.

The above may be performed by acquiring information about the vehicle accident from a variety of sources and comparing that information to the same information compiled from other previous accidents that is housed in a database of historical accident information. Estimates of resulting damage and repairs are then based on the comparisons.

In some embodiments, there is a link between the system that performs the assessments and providers of repair services and also parts warehouses in order to determine the availability of parts and approximate time of repair.

Other embodiments pertain to an in-vehicle accident detection, analysis and notification system. An additional usage of the system is for monitoring driving behavior; developing insurance premiums based on the monitoring and also effecting change in driver behavior than make a driver safer and less of an insurance risk. In an embodiment, the system comprises one or more of the following components:

1. A vehicle on-board system comprises:
   i. a processor which monitors and analyzes onboard sensors used to detect vehicle activity and driver behavior;
   ii. an on-board database comprising:
      1. which stores vehicle specific information;
      2. Patterns, for the individual vehicle type, used to analyze sensor data to detect accidents and to assess resulting injury and damage and useful to predict driver behavior and driver/insurance risk;
      3. Driver information;
      4. Emergency contact information;
   iii. one or more of several data transmission components which can include both short-range wireless (for example Bluetooth), long-range wireless transmission (for example mobile service) and wired-data communication component—which can communicate with external servers to transmit both raw sensor data and damage/injury estimation and to provide software and database updates to the vehicle on-board system.

2. A central server comprising:
   i. One or more computers;
   ii. A comprehensive central database located on one or more servers comprising:
      1. historical information from several sources;
      2. raw sensor data or indices derived from the raw sensor data from individual vehicles;
      3. Patterns for all vehicle types and areas;
      4. Geographic Information;
      5. Spatial, temporal, and severity information pertaining to accident incidents;
      6. Metadata.

Vehicle onboard databases facilitates the analysis of the type and severity and potential cost of repair/injury treatment of the accident and also facilitates the immediate notification of the accident occurrence and assessment to interested parties.

BRIEF DESCRIPTION OF THE FIGURES

FIGS. 5A-5C are typical pages of an accident report.

DETAILED DESCRIPTION

Glossary

Figure 1:
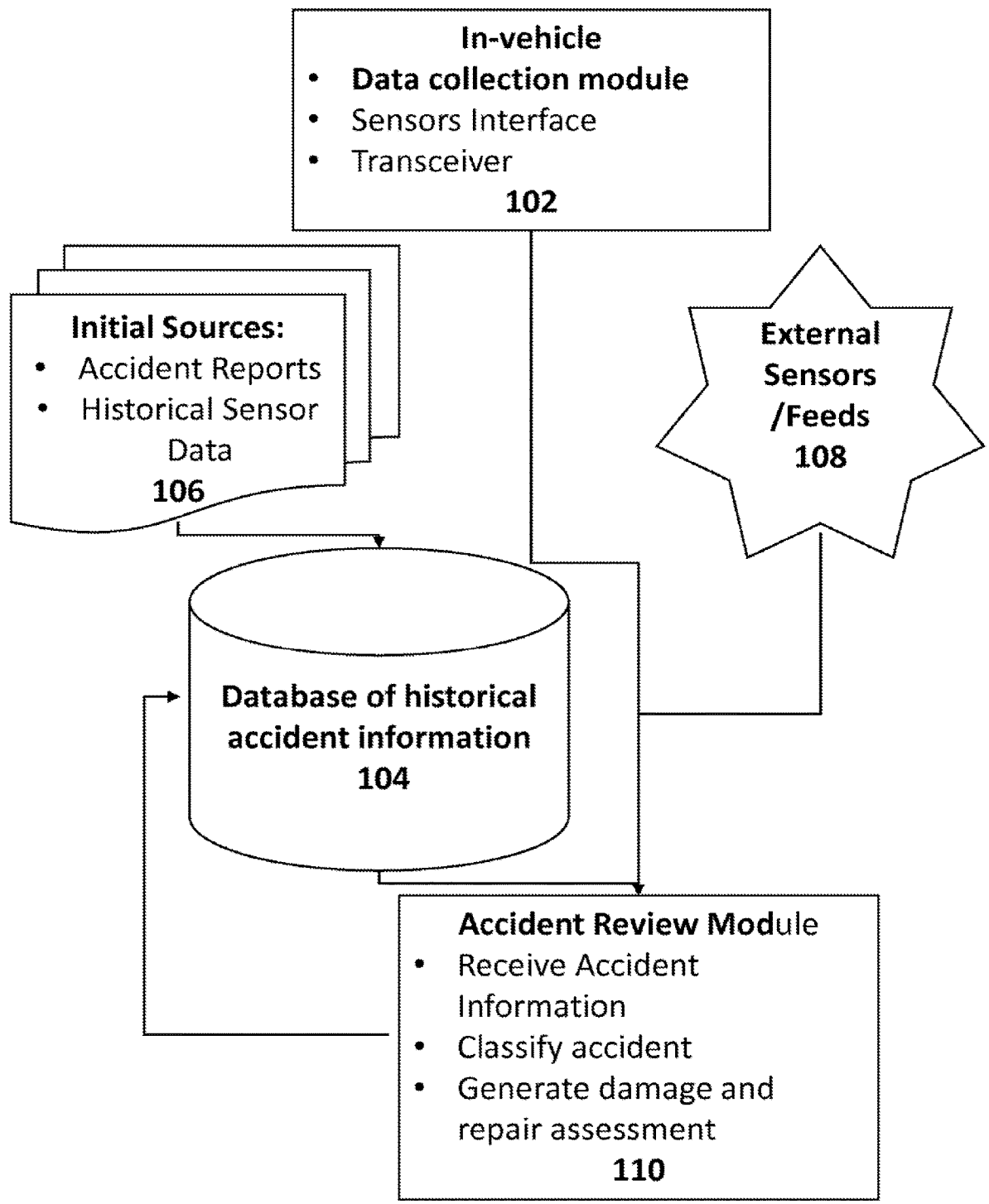
FIG. 1 is a system overview for estimating vehicle accident damage and cost.

Accident Damage and Repair Estimate: a document or report (either hardcopy or online) that results from analysis of information relating to an accident, that estimates the amount and extent of damage to a vehicle and how much work and/or money it will take to fix it.

In-vehicle: Refers to anything that is part of the vehicle or within or attached to the vehicle.

Sensors: measurement devices which measure parameters that are directly or indirectly related to the amount and extent of damage incurred during a vehicle accident or to the underlying cause of an accident. Sensors could be in-vehicle—either part of the vehicle or an after-market attachment to the vehicle such as a fleet management system or as part of a mobile device within the vehicle such as the sensors in a mobile phone—like accelerometers or gyroscopes. Sensors may also be outside the vehicle such as roadside traffic counters in the vicinity of the vehicle, weather stations, and satellite or airborne based sensor such as LIDAR. Sensors that can inform interested individuals about the condition of pavement, weather, freeze thaw conditions or the like are included.

Transceiver: A means to communicate between two devices whether it be wired or wireless. Examples are two-way radios, mobile phones, wired modems and the like.

Location: where an object is relative to a reference frame. The location of a vehicle is some embodiments is relative to the earth in terms of a coordinate system such as latitude and longitude (and perhaps elevation).

Vehicle: any object capable of moving material or people along a transportation network. This includes cars, trucks, boats, airplanes and the like.

External Observations: See the definition of sensors above for examples of observations that can come from outside the vehicle. Source for this information can also be from web services, for example weather data, or traffic information that is a feed coming in from a FM sideband via an FM receiver.

Reference (for a database): an index or other attribute that can be used to select database records of interest by querying using the index or attribute. For example reference for accident information could be: location, time, time of day, time of week; make of vehicle, year of vehicle (or Vehicle Identification Number), weather conditions, location of impact (zone on the car), direction of impact, force of impact and the like.

Normalized: transforming data from a variety of sources into the same units, in the same frame of reference.

Historical Accident Database: a database or collection of linked databases containing information that is related to individual accident events where all information is cross referenced so that it can be used for statistical analysis of accidents and the cost of repair resulting from the accident.

Cross-referenced: With respect to a database, one entry can be queried as to its relationship to another if there is some type of relationship between the two. For example, a certain model of water pump produced by General Motors may have been used in a variety of car models over a variety of model years, so the part number for the water pump will be cross referenced to vehicle model number, year, engine type. Also note these parameters may not be sufficient information, because a part used may change mid-model year. For example a wheel type my not be compatible halfway through a model year because the lug spacing was changed for safety reasons. In this case, the wheel would have to be referenced to the specific Vehicle Identification Number (VIN) which could be further cross referenced to a linked database containing more detailed information.

Confidence Interval: One method of expressing the probability that an outcome will be observed to happen within a specific range for a given set of circumstances. For example the probability that the front bumper will have to be replaced for a collision with a force of impact perpendicular to the front bumper and impact at speed greater than 5 mph is 95 percent for a Ford Focus and 92 percent for a BMW 928i.

Bias: Tendency to make certain observations more than others.

Accident Pattern: A known isolated or sequence of sensor readings that are indicative of a vehicle accident or collision occurring. For, example, it may be observed that in a front end collision that the ABS brakes are always applied followed by a rapid deceleration in the direction of travel and finally followed by a complete stoppage of the vehicle.

Damage Pattern: Once it is established that an accident has occurred by observation of an accident pattern occurring, sensor output before, during and after the accident is compared to predefined damage patterns which comprise a sequence and/or collection of sensors readings that exhibit behavior indicative of particular damage being caused. The level of damage, for example, may be associated with the time interval between the application of the ABS brakes followed by the stoppage of the vehicle.

Injury Pattern: Once it is established that an accident has occurred by observation of an accident pattern occurring, sensor output before, during and after the accident is compared to predefined injury patterns which comprise a sequence and/or collection of sensors readings that exhibit behavior indicative of particular injury being caused to the driver and/or passengers.

Driver Pattern: A pattern established that is indicative of driving behavior. For example, frequent fast acceleration from a complete stop may be indicative of reckless driving; comparison of a gps trace while driving and determining that the driver is frequently veering over the median may be indicative of distracted driving. Likewise obeying the speed limit and no undue acceleration would be indicative of a good driver.

On-board: Refers to being part of the vehicle or contained in the vehicle. An onboard sensor therefore could be a sensor that is integral to the engine such as an oxygen sensor, for example, and also sensor in installed aftermarket equipment or sensors in a smartphone that resides in the vehicle. Examples of these type of sensors would be an accelerometer or gps. Processors used to query, record and analyze information can likewise be part of a stock vehicle, and add-on product or a mobile device that resides in the vehicle.

Transfer Function: If an initial database does not contain sensor data from vehicle on-board sensors, but it is built with information transferred from accident reports, then it is necessary to equate how a verbal observation relates to a sensor measurement. For example, perhaps a description of a right front quarter panel being replaced would be assumed to be equivalent to an impact at 45 degrees from the longitudinal centerline of the vehicle with a force of the weight of the vehicle/5 g's.

Driver Insurance Risk: The probability that an insured will make a claim and for how much given a variety of measured factors. It could also refer simply to the probability of being in an accident.

Transportation Network: A system of road, streets, paths, sidewalks, trails, waterways or other ways that a vehicle or pedestrian travels along. A transportation network can be subdivided by the type of vehicle or pedestrian that is intended to be used for. For example, roads and streets may be used by cars, trucks and busses. Trails and sidewalks may be used by pedestrians and perhaps bicycles. Transportation networks are generally stored in a Geographic information System that documents the location and interaction of various components of the transportation network. Attribution is also associated with the various components of the network.

Transportation Element: Is a distinct component of a transportation network that has an associated geographic coordinate's. Examples of elements are road segments where the road begins and ends at an intersection; an intersection between two or more roads; or the boundary of a lake.

Attribution: Attribution associated with a transportation network includes any piece of information that can be related to a spatially referenced element or component of the transportation network. Examples are such things as speed limits, number of lanes, connections between components, or type of vehicle that can traverse the component. Attribution, in addition to being spatially referenced may have a temporal (time) component expressed as, for example, time of day, time of week, or time of year. An example of this is the speed limit in a school zone.

Metadata: Metadata is a special kind of attribution associated with the quality of components of transportation network. Metadata can be associated with individual geographic components, attribution or the source of the geography or attribution. Metadata may be associated with precision or accuracy of the components or source. Metadata may have a component that list the age of the source.

Maneuver/Complex Maneuver: A maneuver is an attribute associated with an action that can be either perform or not performed and which is associated with one or more components of a transportation network. For example, a no-left-turn at an intersection is an example of a prohibited maneuver. A complex maneuver is generally associated with more than one component of a transportation network—for example, what is known as a Michigan Left Turn, in which a vehicle desires to turn left at an intersection, but in order to do this has to turn right, cross one or more lanes, then cross a median on an avenue, then turn left, is a complex maneuver.

Index: One or more values used to multiply or otherwise adjust up or down a baseline value. For example if a prospective insured base premium is $100, discounts and/or increases to the base may be applied by multiplying the base by a crash index, a driver age index, a safe driving index or a single index that is based on a number of parameters.

Parameters: Any factor that may be directly or indirectly be related to insurance risk, accident pattern, injury pattern, damage pattern or driver pattern.

Multivariate Analysis: A class of statistical analysis used to determine the relevance of one or more parameters in predicting an outcome and used to build a predictive function base on one or more of the analyzed parameters. In this case the outcome is the prediction of insurance risk.

Accident Count: The number of accidents that occur for a given element of the transportation network over a given time. This may be further subdivided based on weather conditions and/or time of day, time of week or based on other attributes that may influence accident occurrence.

Incident: A single occurrence of a measured parameter. For example an individual accident report is an incident of the parameter accidents; a recorded speed of an individual driver along a segment of road is an incident of speed of travel for that segment.

Granularity: This term is used to refer to the specificity of either an attribute or index. For example, if an accident count is based simply on the transportation element it took place on, it is less granular than if the accident count is based on the location (element) and the time.

Insurance Risk: This term is used collectively for all embodiments of the present invention to encompass the desired outcome of an insurance risk model. Examples of desired output are the probability of: having an accident, making an insurance claims, or making an insurance claim within defined monetary limits.

Below are examples of elements of a vehicle insurance risk database. Some or all of these elements may be used to develop a risk model or risk indices.

Standard GIS road network including:
  Road Segments
    Geography typically stored as a series of end nodes locations, and a series of shape points (internal points that define the location of the segment) or as a geometric function.
    Attributes Stored relative to a node or the segment as a whole (Road segments typical have an end node at the intersection with another road segment or a political boundary or a geographic feature.)
  Intersections
    Geography may be stored as either a singularity or a series of point and lines which make up a complex intersection (such as a highway cloverleaf)
    Attributes are stored that are associated with the intersection and/or the connecting segments
  Maneuvers (including complex maneuvers)
    Geography usually stored as a reference to one or more geographic components that make up the maneuver
  Attribution Examples (all attributes may have multiple values base on time and may also have metadata associate with them):
    For Segments:
      Speed limit/Actual Speed Driven
      Accident Count
      Historical Traffic Flow/count
      Historical Weather Information
      Number of Lanes
      Vehicle Type Access
      Street Side Parking
      Elevation/Change in Elevation
    Railroad crossing
    Political Boundaries
    Parking Areas
  Historical Data
    Crimes associated with a location (snapped to road segment or intersection); time of data; time of year
    Accidents: type of accident (solo or collision): location, direction of travel; date, time of day; type of vehicle; weather, driver record
    Previous Claims: location; type of claim (accident; vandalism; car-jacking); amount of claim; type and age of vehicle.
    Police citations: location, type
    Weather: ice, temperature, wind, pressure, snow, rain, flooding
    Time Series of sensor data before during and after an accident; or indicative of a driver pattern Overview of Embodiments Knowing when and where a driver drives and knowing the historical risk associated with driving a given route at a particular time, a formula can be derived to predict risk for individual driver which in turn can be used to set rates. Because the parameters related to driving/insurance risk and driving habits of a given driver are associated with transportation system elements in the present invention, a more refined model of risk is possible than for insurance risk solutions in the art. Determining premiums based on a single point or region (for example a residential address) does not take into account where a person drives on a regular basis.

As the correlation between one or more risk parameters and insurance risk may vary over time and may vary regionally, it may be needed to statistically analyze the parameters used in a model and continually change them over time. In addition, historical parameters used may lose relevance with time and will need to be retired or withdrawn from the determination of risk—relying on more recent data.

Real time information (while the insured is driving) may be much more relevant to risk. For example, if the road is icy, the likelihood of making a claim is potentially higher, than if the only information available is that is likely to be icy at the timeframe when driving.

With a dynamic rating system that is continually updated and also has a real-time component, it is further possible to compel drivers to adjust driving habits based on the real-time information to reduce the risk. For example, if a particular route is known to be icy, and the course the driver is taking is being monitored, and the monitoring system further suggest an alternate non-icy route, then the driver can be rewarded for avoiding risky conditions by a reduced premium, or by monthly rebate checks or similar.

Real-time information can come from a variety of sources such as wireless acquired weather information and traffic reports. This information can further be statistically aggregated to produce historical weather/traffic risk information likelihood indices that are spatially and temporally indexed. Metadata associated with the historical information can then be used to cull older information and continually update the indices with the latest information. Also continuous, real time, accumulation of accident reports with root causes can be helpful to asses and distribute that risk across the total driving space of some geographic region.

If is further possible to assist a driver by providing a display of driving risk. The driving risk, for example, could be displayed much like traffic information on a map with high risk being displayed on routed segments in a red color and using other colors for route segments of lesser risk.

In embodiments of the present invention, one of the goals is to predict the amount of damage that is incurred during an accident and how much it will cost to repair. Damage incurred is a function, for example, of what kind of car was being driven, the age and condition of the car, the location, direction and force of collision impact on the vehicle during the accident. The cost of repair, for example, is a function of the locale of the accident (regional variation in parts costs and labor costs), the parts that need to be replaced given the specific class of accident, the materials needed, for example paint and sandpaper, and the amount of labor required to perform the repairs.

Since no two accidents will be the same, the accidents must be classified or grouped together, so that information based on observed parameters recorded during historical accidents can be used to predict and assess damage that happens in accidents occurring now.

It is further object of this invention to locate and reserve parts that may need to be replaced—immediately after an accident.

Another object of the invention is to schedule time for repairs with qualified technicians—immediately after the accident.

It is an object of the invention to continually update the database of records for previous accidents with information that can be better utilized to predict future assessments of accident damage.

It is an object of the present invention to determine blame or apportion the blame in a two vehicle accident.

It is an object of the present invention to estimate when the cost of repairs would exceed the worth of the vehicle.

System Designs

Systems designed to predict damage and necessary repair resulting from vehicle accidents can come in a variety of configurations. However basic components and/or functionality are common to most as shown in FIG. 1. Primary components are:
 In-vehicle data collection module 102
 Database of historical accident information 104
 Accident review module 110

When initially constructing the database 104, multiple sources of information 106 are used which include accident reports from police or insurance adjusters, repair invoices, parts lists, and the like. In addition, sensor data that was recorded (if available) during accident events is also stored in the database 104. The database 104 may contain the raw data, the predictive functions, and metadata (for example, error estimates on the validity of the data). The database 104 also contains derivative products of the sensor data such as categorized or normalized versions of the input data and/or functions for which to categorize or normalize each type of input. Once an initial database is configured and populated, statistical predictors are formulated based on the historic information in order to predict damage and cost in future accidents. In operation, an in-vehicle data collection model 102 comprises a sensor interface capable of receiving and storing data from sensors within the vehicle or part of the vehicle. The data collection module can communicate with an accident review module 110 which can either be located in the vehicle or remote to the vehicle. Communication can be either by wired or wireless methods. In addition the accident review module 110 can acquire information from external sensors networks such as weather feeds and traffic. Note this function could alternatively take place in the in-vehicle data collection module 102. The accident review module 110 receives all the pertinent information concerning an accident, categorizes the information; inputs the information into a predictive function, then predicts the damage incurred during the accident and the anticipated cost. At least one of the raw data and derivatives of the data, such as normalized data, categories data, and error estimates are then transmitted to the database 104 to be used in updating the predictive function. Later information from repair facilities are also input into the database and are used to validate the prediction and improve the prediction going forward (not shown).

Communication Protocols

Referring to the schematic of a system FIG. 1, the information that is either stored or generated in the various components needs to be communicated to other modules of the system. Sensors need to communicate with data collection module 102. If the sensors are part of the car (air bag sensors, integrated GPS—for example) then communication would typically happened using the car's system bus which could be either conventionally wired or based on fiber optics provided the data collection module 102 was integral to the car electronics. If the data collection module 102 was an add-on product or consists of software running on a mobile device within the car, then communication with the integral vehicle sensor may be by using an interface that can read on-board diagnostic (OBD II) codes by interfacing with a car portal designed for external communications.

Figure 2:
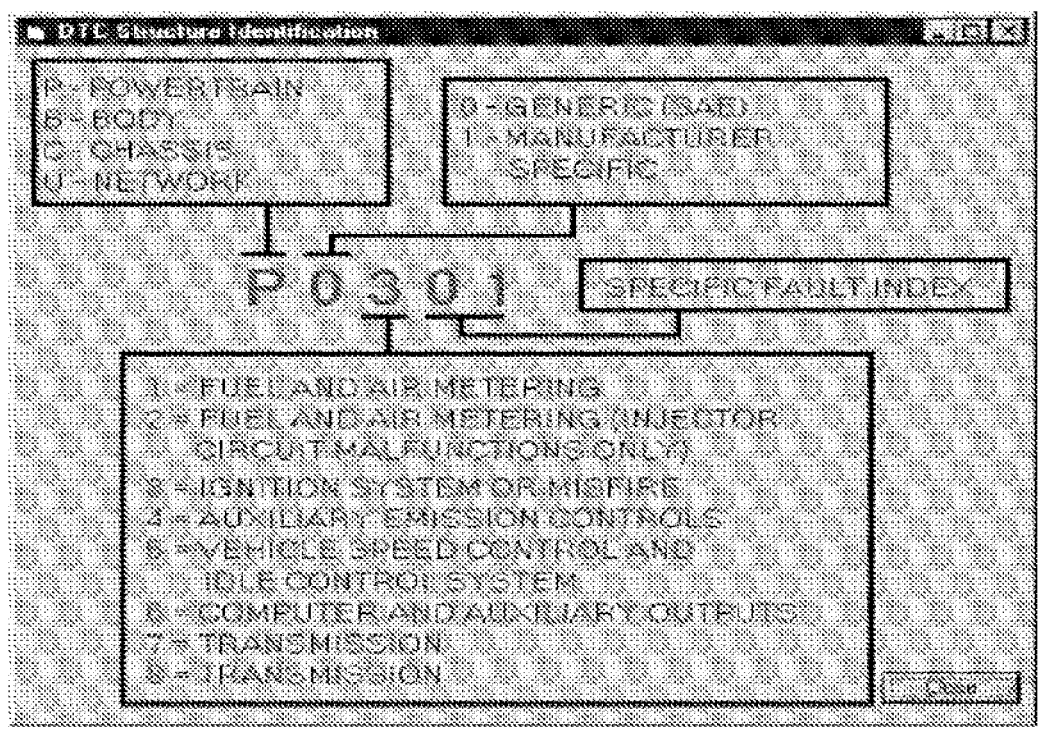
FIG. 2 is a sample of how vehicle faults are indicated in diagnostic trouble codes (DTC).

Another type of code that is somewhat standardized for automotive diagnostics is the diagnostic trouble codes (DTC). FIG. 2 describes how a typical DTC is structured.

Many vehicles have bluetooth or similar short range wireless protocol communication modules and can transmit information such as DTC codes to nearby devices.

If the vehicle data collection module has software running on a general purpose computing device such as a mobile phone, the phone or other device could be plugged into the vehicle using a wired means such as a Universal Serial Bus (USB) or short range wireless such as Bluetooth.

Sensor that are part of the mobile device can also be considered in-vehicle sensors provided the device is in or attached to the vehicle. These type of sensors can include gyroscopes, accelerometers, altimeters and GPS, for example. Communication with these sensors would be over the data bus of the portable device.

External data coming from services or external sensors can be communicated through an internet connection, FM sidebands (such as traffic messaging channel information TMC).

Database Design and Input Normalization

In embodiments of this invention, vehicle damage from an accident is predicted by comparing the observed conditions that occur during an accident with similar observed conditions for similarly classed accidents stored in a historical vehicle accident database and the damage resulting from those accidents. Algorithms are developed to classify each type of accident as succinctly as possible, given the available data, such that when the conditions of a present accident match a classification, this can be used with a degree of certainty, to predict resulting damage and the parts and services necessary to effect repairs.

In an embodiment, the observed conditions of interest during an accident include:
  Specific type of vehicle, including make, year, model, weight and options
  Condition of the vehicle (prior damage, corrosion, state of repair)
  Location of collision impact, force and direction
  Locale of the accident (for determination of regional variable costs)
  Environmental factors (weather, road conditions)

Raw data that may be used to predict accident damage and repair needed can come from a plurality of sources. Sources include:
  In-vehicle Sensors
    Accelerometer to measure force of impact and direction of impact and any motion that occurs after the accident such as rollover of the vehicle
    Gyroscope to measure direction of travel when a GPS is unavailable
    GPS for speed and direction of travel
    Air bag deployment and seatbelt sensors
    ABS brake sensors
  External Sensors
    Weather from web services
    Traffic information from web services or FM sideband (Traffic Messaging Channel)
    Road Condition Information from web-sources such as highway departments
  Other means of collecting information
    Police Reports (subsequently manually entered into the system database by manual entry using a computer interface application
    Insurance adjuster reports
    Via the driver or passenger or observer of the accident input from a mobile device running an interface or app that allows the input and connects to the system.
    Accident scene photographs depicting the damage which are analyzed either manually or using image analysis techniques Note that the historical accident "database" may be distributed, so that, for example, the predictive function may be in the vehicle and the historical raw data may be on a central server.

When initially building a historical vehicle accident database, it is likely that there will be a mix of more qualitative data, for example from manually entered police and insurance adjuster accident reports and quantitative data, for example, from in-vehicle sensors. As such there is a subjective element in the reporting and the likelihood of human error will reduce the quality of the manually entered data and therefore if the manually entered data makes up the bulk of the available information, the error in prediction of collision damage will be greater.

In addition, since much of qualitative information would have initially have been manually entered on a piece of paper, there will also be transcription errors regardless of whether the information is manually input into the database by a human or if the information is machine input using optical character recognition and algorithmic processing of the text.

Available information to input into the database will change with time. As more information of a quantitative nature or more precise, accurate and with less bias information becomes available, older more qualitative data will be replaced and the resulting predictive model or associated statistics will be updated to reflect the new data.

There are at least two methods to deal with disparate data (differing quality and precision) that can be used to model an event: 1) You can make the initial predictive model imprecise, for example, using quadrants, sextants, or octants or other slice of the vehicle to identify the location of impact and you could identify the force of impact quantitatively using low, moderate and extreme impact (or similar rating system); and 2) you could structure the database to support a more precise model, but indicate that initial predictions will have low accuracy.

Figure 3:
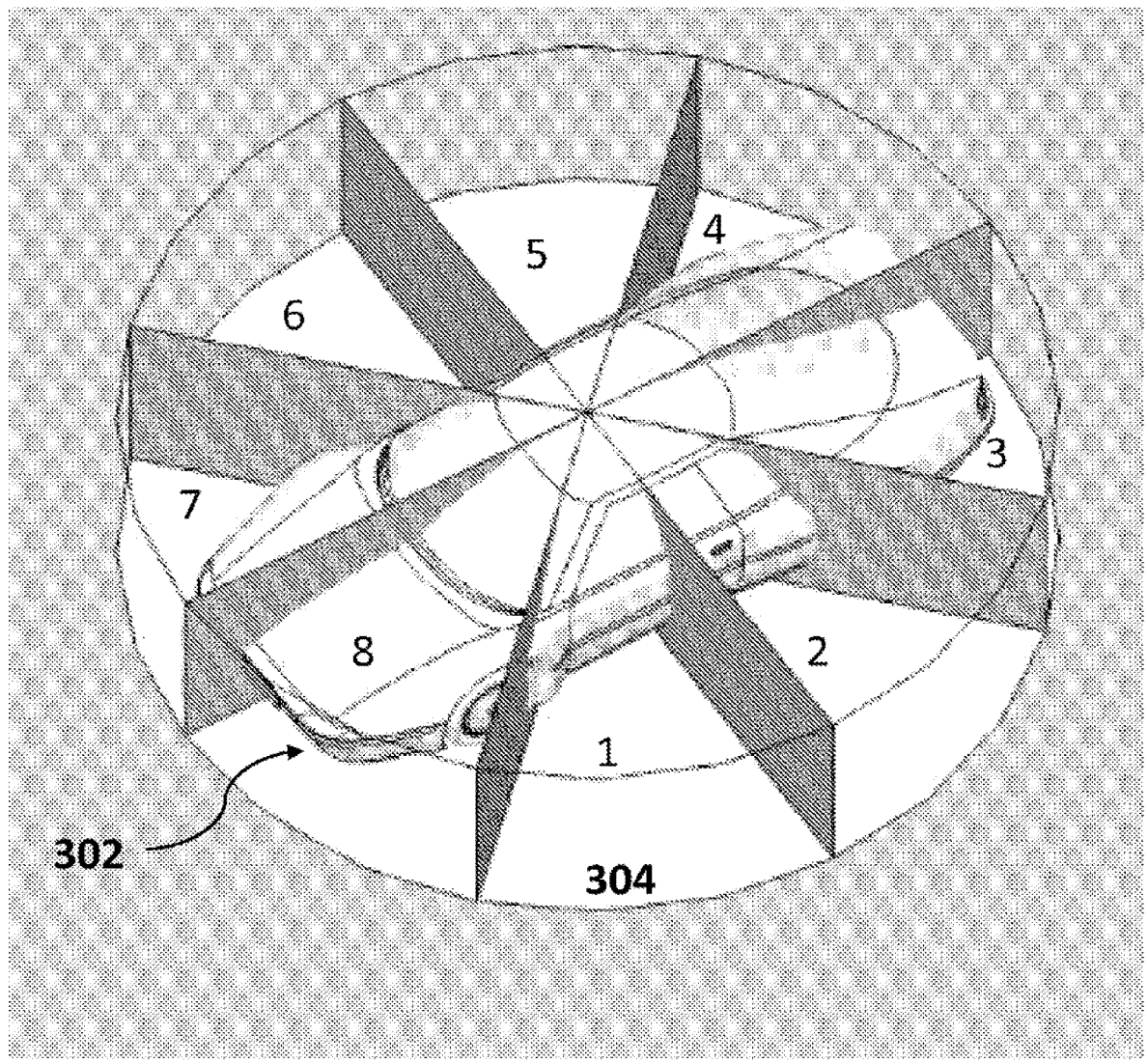
FIG. 3 is an example of a method to divide up damage locations on a vehicle to 8 pie shaped zones.

FIG. 3 is an example of an imprecise method to represent where damage has occurred on a vehicle 302. A vehicle 302 is divided into a number of slices 304. Damage would be categorized by the number of a slice 304 it occurred in.

Figure 4:
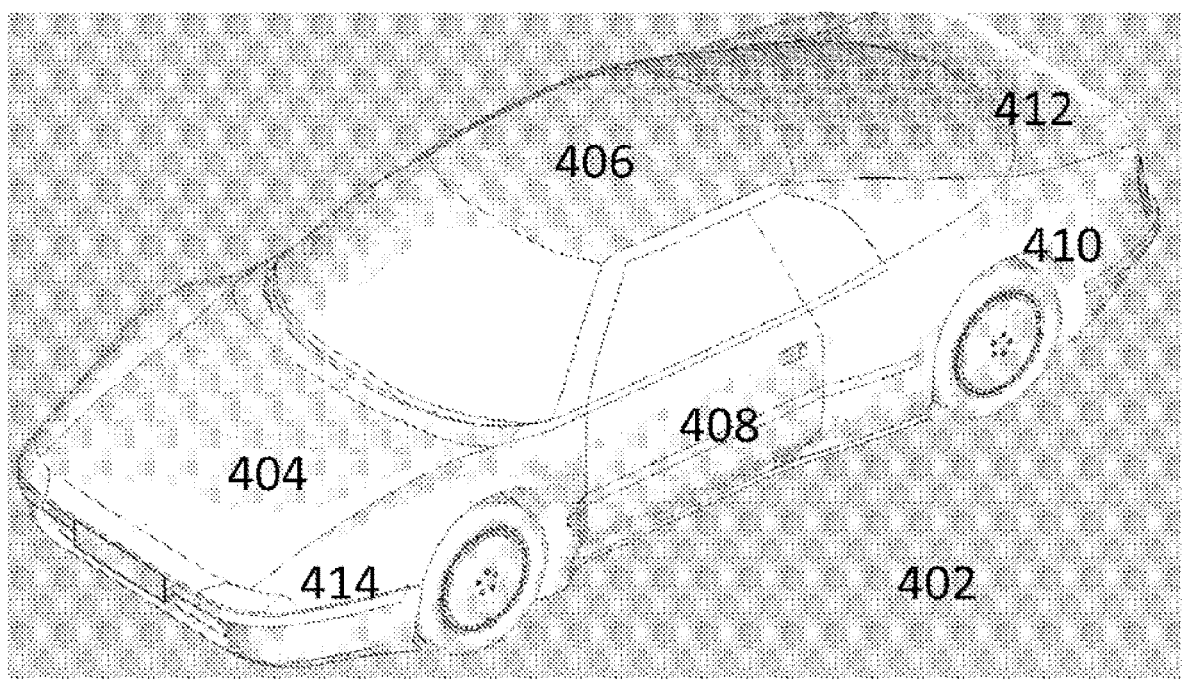
FIG. 4 is another method to divide damage zones by panels.

FIG. 4 is an example of a more precise model for classification of direction and location of impact on a vehicle 402. Differing components of the vehicle are identified and damage is associated with the component, for example, hood 404, left fender 414, left front door 408, left rear fender 410, trunk 412, and roof 406.

For information from disparate sources to be compared, the information must be normalized, i.e. converted to the same units of measure and be relative to the same reference frame. In addition, the quality and precision of the data must also be evaluated and represented within the database in a normalized fashion. In other words, if for example, one speed is known to be accurate within +1-10 mph, then all speeds in the database should have an error of estimate in mph (as opposed to kph for example).

A probability that a particular level of damage or type of damage will occur if a series of measured parameters fall within a specified ranges is calculated. No two accidents are alike, so any prediction will not be 100 percent accurate and it is best to either provide an error of estimate associated with each estimate and/or provide an upper and lower range of probable damage and costs.

If an initial build of a database is created from mostly quantitative data, then it may not be possible to predict specific damage and may only be possible to predict cost of repair, and with a large degree of uncertainty.

If the input data is a mix of in-vehicle sensor data, and manually input qualitative data then, using statistical techniques know in the art, the predictive function can be generated weighting the sensor data more heavily than the qualitative data.

With respect to force of impact, in-vehicle sensor measurements can be used to accurately calculate, using methods known in the art, the force and direction of impact, if the velocity or acceleration and mass of the vehicle or vehicles involved in the collision is known during the period of time encompassing the accident.

Direction and area of impact (on the vehicle) is very important. For example, if a vehicle if backing up at slow speed and the driver does not notice a telephone pole, if the impact on the rear bumper is more towards the middle and the direction of impact is more perpendicular to the bumper, as opposed to impact near the corner of the bumper at an angle less than perpendicular, this could mean the difference in no damage to the bumper, as opposed to having to replace the bumper—given the same speed of impact.

Likewise, the direction of impact given the same speed of impact, may cause a greater number of airbags being deployed making the difference between the vehicle being totaled and the vehicle being salvageable.

Reduction of Information from an Accident Report

Figure 5A:
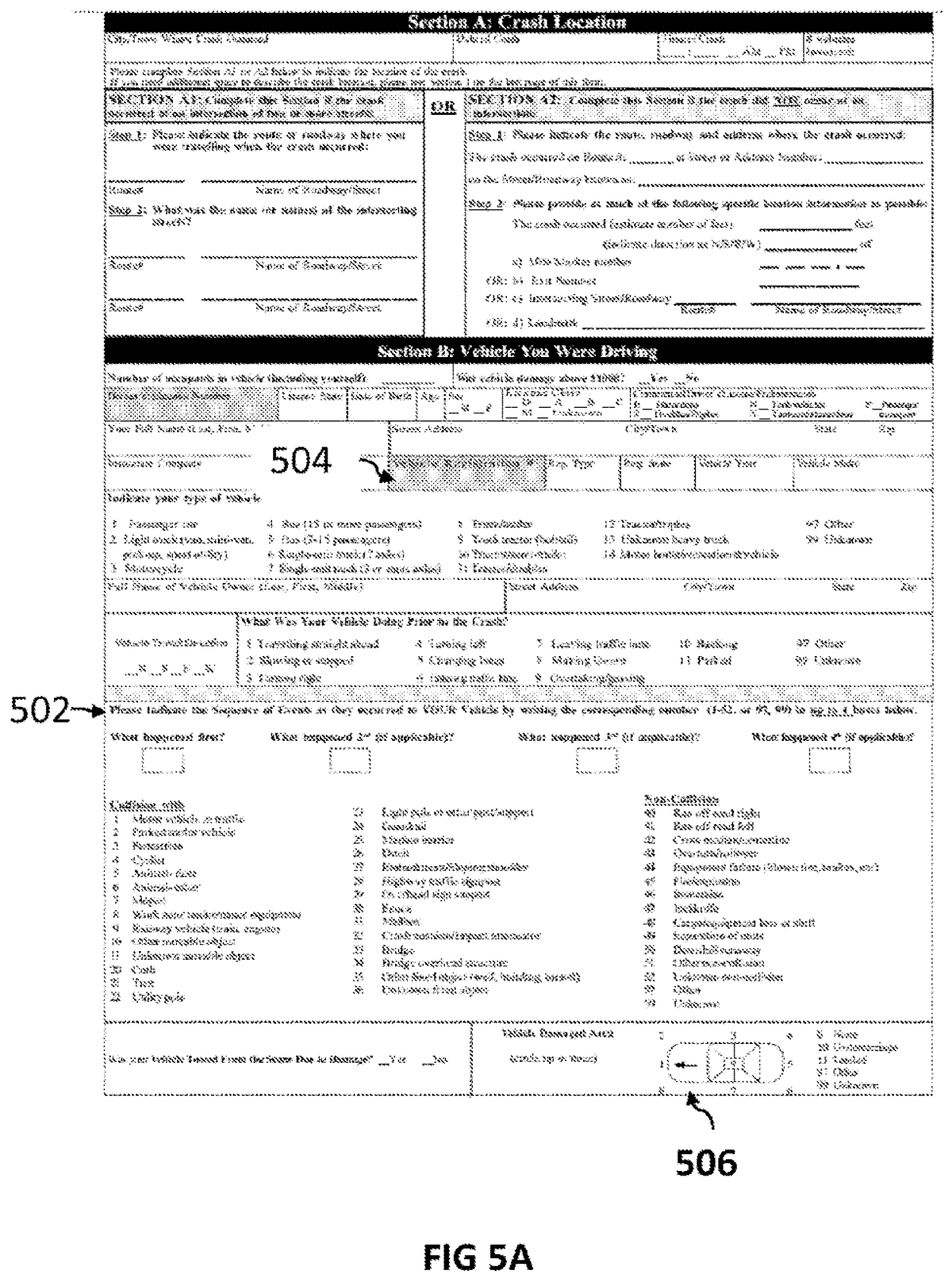
Figure 5B:
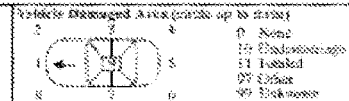
Figure 5C:
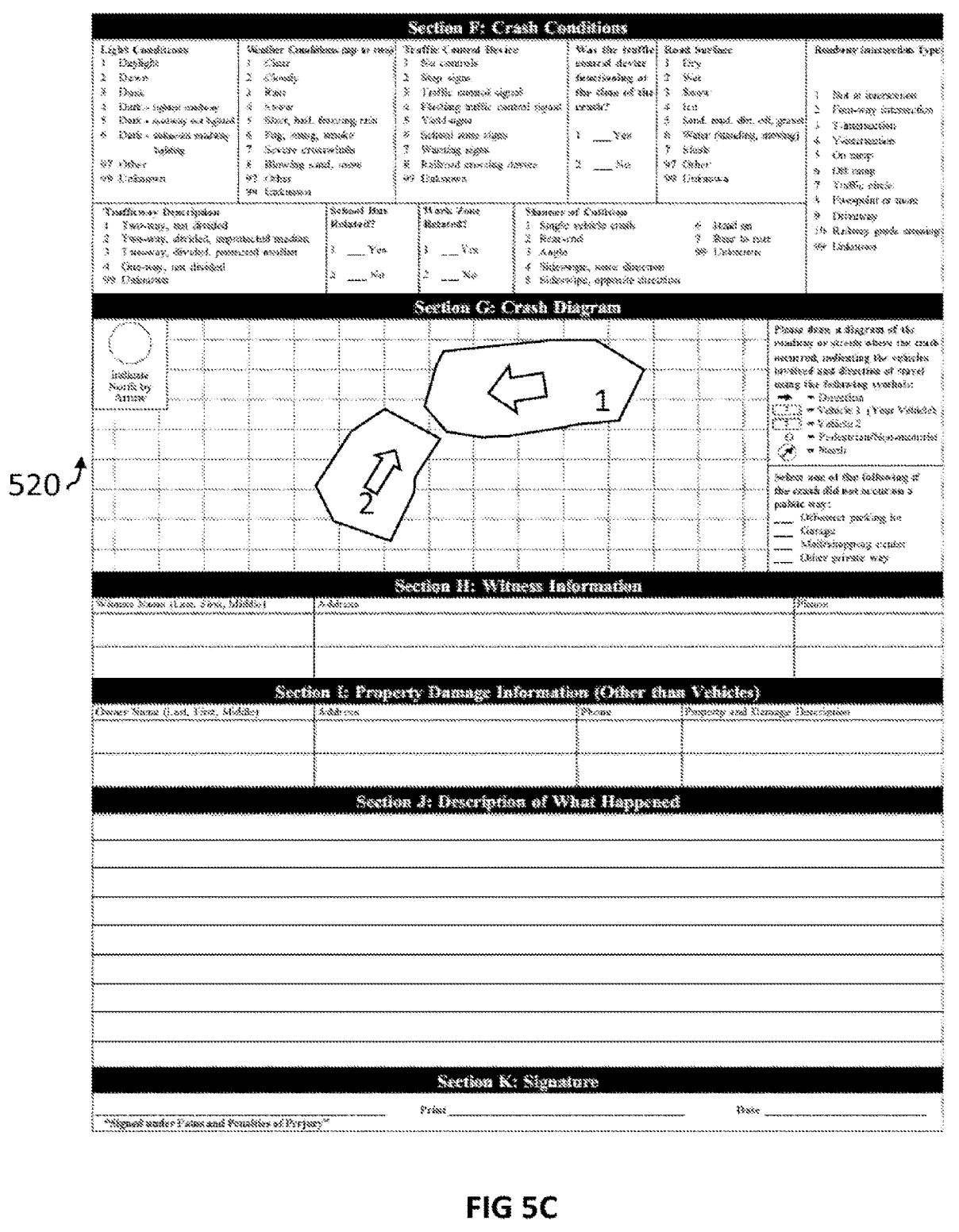

FIGS. 5A-5C are an example of a typical accident report (this particular one is from the Massachusetts Department of Transportation) and it contains several parameters that can be used to provide input for a historical vehicle accident database.

Since no two accident reports would be the same, the raw data from many type of accident reports could be entered into a database, then normalized to be used in the predictive model.

The process could be as follows:
Create a section of the accident database to house the data from each particular form
If the form is in paper form, scan in the pages of the report:
  Optically recognize the characters and use search techniques to find headings of interest—for example FIG. 5A 504 Vehicle Registration # and further down the line Vehicle Year and Vehicle Make.
  Find the value associated with each heading and enter it into the database
  Manually enter other data, for example in FIG. 5A 506, it may be necessary to interpret the vehicle damage (signified by circling a code for the appropriate damage zone) manually.
If the form is tag based (for example XML) or in other machine readable form:
  Enter the information into the database directly
Obtain information regarding the repairs that were performed to fix each particular accident or alternatively determine if the vehicle was totaled and the rationale for this determination.
Find statistical relationships between the damage assessment from the accident reports and the repairs made.
Determine a common schema for the predictive database that all the various report structures can be normalized to (see below) and transpose all the data from differing reporting structures to a single format (or at least store functions to normalize all the information).

Values to be input into a database associated with collision impact can be approximated by the quantitative information provided in FIGS. 5A-5C. For example, in FIG. 5A, under the section "Sequence of Events" 502, you could determine whether an accident was a single car or multiple car accident. You could determine if there was more than one event. You could determine whether the object that was collided with, was rigid and unyielding or giveway during an accident. The force of impact could be assigned a value based on various events: for example, a collision with a utility pole (as indicated on the form—FIG. 5A 502 under heading 23) at a particular speed would generate a greater force of impact than a collision with a bicycle (as indicated on the form—FIG. 5A 502 under heading 4) given the same vehicle. A vehicle with more mass would have a greater force of impact than a lighter vehicle (mass could be determined by information in Section B of the accident form (FIG. 5A 502). Further in FIG. 5C 520—the crash diagram, the relative direction one or both vehicle were traveling could also be factored into the force calculation, however, it would most likely be necessary to limit the zones of impact based on the panel of the car impacted (door, fender, hood, etc) or on a quadrant or sextant, or octant for example as show in FIG. 5A 506.

As in FIG. 5A 502, there could be multiple events in sequence. For example, a glancing impact by one car with another could cause one of the cars to roll over. In which case you would have multiple impact locations. To quantify this, the database could be designed, similar to the accident form, to have multiple events, or the database could integrate the force of impact for the multiple events.

It should be noted in some embodiments, that more detailed information and information that does not have to be normalized or transposed is preferable. Also information that can be automatically acquired and processed, rather than manually entered is also preferable.

In an embodiment, as more sensor data that can be correlated to accident damage becomes available and is entered into the database, then manually entered and transposed data should be removed from the database and relationships should be re-calculated.

There will be bias associated with certain measurement types. An example would be transcription of the location of impact from a drawing on a police report (FIG. 5C 520), you would most likely visually estimate the direction of impact, and would furthermore probably enter an even value to the nearest 20 or 30 degrees. Therefore you would have a bias for measurements at even angles at fixed intervals.

More information on how to build the historical accident database and maintaining it for the purpose of categorizing accidents for damage assessment is covered in the related application PCT/IB2014/001656 which is incorporated herein by reference.

Post-Accident Repair Information

In the historical vehicle accident database, there must also exist post-accident information associated with each accident. This information may include:
  A listing of parts replaced
  Body work done
  Price of labor (preferably broken out by part installed or service performed)
  Price of parts
  Time between accident and completed repair This information must be associated with the accident report information and/or sensors information so that correlations can be made. Insurance companies are a likely source of information for both that accident report and the repair information.

Development of the Predictive Model

Armed with the populated historical vehicle accident database, a predictive function can be developed. As a starting point, it can be assumed that damage is a function of the specific vehicle, and the force of impact (including direction and location of impact on the vehicle). Using this assumption, for a given accident, a query can be run on the database to find all accidents that have:
  A force of impact:
    Approximately the same as the force of the present accident
    In a similar direction and location of impact
  The same or similar vehicle
  Based on the query, a list of database entries should be returned that provide:

Parts that have been replaced and costs

Services that were performed and associated costs

Statistics can then be run on the returned entries: for example, the probability that a particular part was replaced: the range of costs to purchase and replace that part and so-on.

It should be noted if the vehicle accident database spans large geographic areas and large periods of time, then statistics would need to be adjusted (normalized) for things like present value of money and regional costs differentials.

Depending on how much information is in the database, a query could be very specific, for example, the vehicle model could be simply a Mustang, or the vehicle type could be a Mustang XL. The XL designation could correspond to a different trim package, for example, the XL may have magnesium wheels instead of steel. If the database is refined enough to have enough Mustang XL entries, then there may be a high probably, for example, that in a one car collision traveling at 35 mph where the impact with a stationary object occurred on the left front quarter panel, that left front magnesium wheel will have to be replaced. Alternatively if there is insufficient information about the Mustang XL in the database, then the query could be for all Mustangs. The returned information could be that it is likely that the left front wheel would have to be replaced, but the database does not distinguish costs for steel vs. magnesium wheels in this instance.

As the amount of information in the database continues to grow and be refined, the relationships for how to predict damage may change depending what factors correlate the strongest. It may be found for example, that all variations of the same vehicle develop similar damage during accidents or it may be found that there is significant differences in the amount and extent of damage if the same vehicle has a different engine type.

There will be regional variations for cost associated with repairs. Labor charges may be different for autobody technicians depending on location and also parts availability may vary from place to place. This factors also need to be accounted for in the database.

The database of information needs to contain a statistically significant amount of records that can be related to damage and repair. In other words, a quality standard need to be set, for example, a standard could be that cost estimates must be valid within plus or minus $500. Therefore there must be enough previous accident and cost of repair data to be able to statistically validate the quality standard for each category.

Determination of Damage from Sensor Data

In an embodiment, on-board sensors are monitored and the output recorded in volatile memory which is continually overwritten at intervals until some triggering event happens that is indicative of an accident. This could be for example, an air bag deployment or and acceleration value exceeding a threshold. Once the trigger occurs, then the stored data is no longer overwritten, but saved, such that there is information proceeding the accident and the sensor output continues to be recorded until such time as an ending event (such as the vehicle coming to rest) is observed in the sensor output.

Next, depending on the system configuration, the data is either analyzed within the vehicle to produce derivative output or the raw data itself is transmitted to an accident review module for performing analysis.

Derivative output could for example, be a parameter such as the impact force and direction as derived from 3 component accelerometer data. The force and direction could be further categorized into, for example: and impact zone and an impact force level and the direction of impact.

What is transmitted to an accident review module depends on how the prediction model is structured. If the model requires raw sensor data as input, then that is what is transmitted. Likewise, if the model requires further categorized data, then that is transmitted. In some embodiments, both raw data and derivative parameters of the raw data are transmitted, even if the raw data is not used in the predictive model. The transmitted raw data can then become part of the raw data in the database, so the predictive model can be updated by including the new raw data in the analysis.

The accident review module provided with the input data from the accident, then plugs in the information into the predictive model and returns a prediction.

The prediction will include some or all of the following:

A listing of parts that most likely need to be replaced (and optionally probabilities that a part will need to be replaced)

A listing of costs associated with each part (for the region of the accident)

Materials such as paint and supplies

The overall cost estimate (may include an upper and lower limit)

In embodiments, additional information is in the database or in a second linked database. This additional information includes an inventory of new and/or used parts and their location. In addition it may include the workload or backlog of various repair technicians and their availability to perform the predicted repairs that need to be done. Additional functionality of the accident review module in embodiments can do one or more of determining the availability of parts, materials and labor and/or request bids for each from providers that have the part/s, materials or time. The review module, in some embodiments will schedule delivery of the parts and repair labor based on the availability.

Once the damaged vehicle arrives at a shop for repairs, or alternatively if an insurance examiner makes an assessment, the evaluation of the actual repairs and the anticipated labor costs can be compared to the estimates made by the accident repair module. This manual evaluation can also be incorporated into the database to update the model.

In certain instances, for example, the magnitude of impact (or some other parameter) may exceed a statistically determined threshold value, and this would indicated that the vehicle should be totaled (not worth repairing). In these instances, the insurance company may decide to not even send an adjustor to review the case and expedite payment to the insurer.

In other instance, the magnitude of the impact may be such that the probability is that damage will be minor. In these instances, it may be prudent to not send an adjustor but rather settle for some cost that is slightly higher than the norm based on the historical database and avoid the cost of the adjustor visit.

Fault Determination in a Two Car Accident

In most states, in the United States at least, determination of liability in vehicle collisions is based on who caused of the accident. In some situations this fault may be jointly assigned, but not necessarily equally. For example, a driver may have been distracted and veered over the middle line into on-coming traffic, but an oncoming driver may have had ample time to move out of the way, but did not for some reason. In embodiments where in-vehicle sensors are used for accident assessment, these same sensor outputs can be used to infer blame (or exonerate a driver of blame). For example, the combination of GPS and accelerometer readings could indicate a sudden veering out of a lane and into incoming traffic. Another example may be that based on DOT information, the roads were icy at the time of an accident, but based on GPS data, the driver was exceeding a safe speed limit. These are just two examples of information that could be used to assign blame and at least contribute to the assignment of blame.

System Utilization

In an embodiment of the system and method, the prediction of damage and the estimated cost of repair is transmitted to the accident site shortly after the accident occurs. The transmission can occur to either the in-vehicle system or to a mobile device carried by an insurance adjuster or emergency response personnel. By having on-site information about the anticipated cost of repair, this can facilitate rapid settlement of insurance claims and expedite repair. Analysis of fault of the accident can facilitate whether or not a traffic citation needs to be issued by police at the scene.

If the analysis is transmitted to the car, results can be displayed either graphically and/or in text on a screen in the vehicle—for example, an infotainment system screen.

Implementations

The present invention may be conveniently implemented using one or more conventional general purpose or specialized digital computers or microprocessors programmed according to the teachings of the present disclosure, or a portable device (e.g., a smartphone, tablet computer, computer or other device), equipped with a data collection and assessment environment, including one or more data collection devices (e.g., accelerometers, GPS) or where the portable device are connected to the data collection devices that are remote to the portable device, that are connected via wired or wireless means. Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs. DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Alternative Embodiments Shown in FIGS. 6-12

Central Service/Server/Database

One or more servers provide the functions in the form of web services or similar of:
  Communications will vehicle equipped with on-board measurement and analysis systems
  Linking a central data base/s with vehicle on-board databases containing information used in the system
  Analysis of data/creation of patterns for accident detection, injury and damage assessment, driver behavior and insurance risk Database Maintenance/Updating
  Cross correlation of information from disparate sources
  Repository for all related information The central service/server or servers are in periodic communication with the vehicle on-board systems. The database repository needs to contain all pertinent information and raw data to relate sensor data (or data quantified from text based accident reports) and other pertinent measures for detection of accidents and damage and injury assessments in addition to driver behaviour and estimation of insurance risk. It also can contain information to expedite repair of accident damage and to facilitate treatment of passenger injury. The central database may be hosted in a single facility or server or may be hosted in several facilities that are connected via hyper-links and indices. For example data on insurance pay-outs may be in an insurance company database and details of related accidents may be in an accidents report database (at the police station) and the two are linked by the Vehicle Identification Number (VIN) of the automobile and the date of the accident.

Database Content

Figure 6:
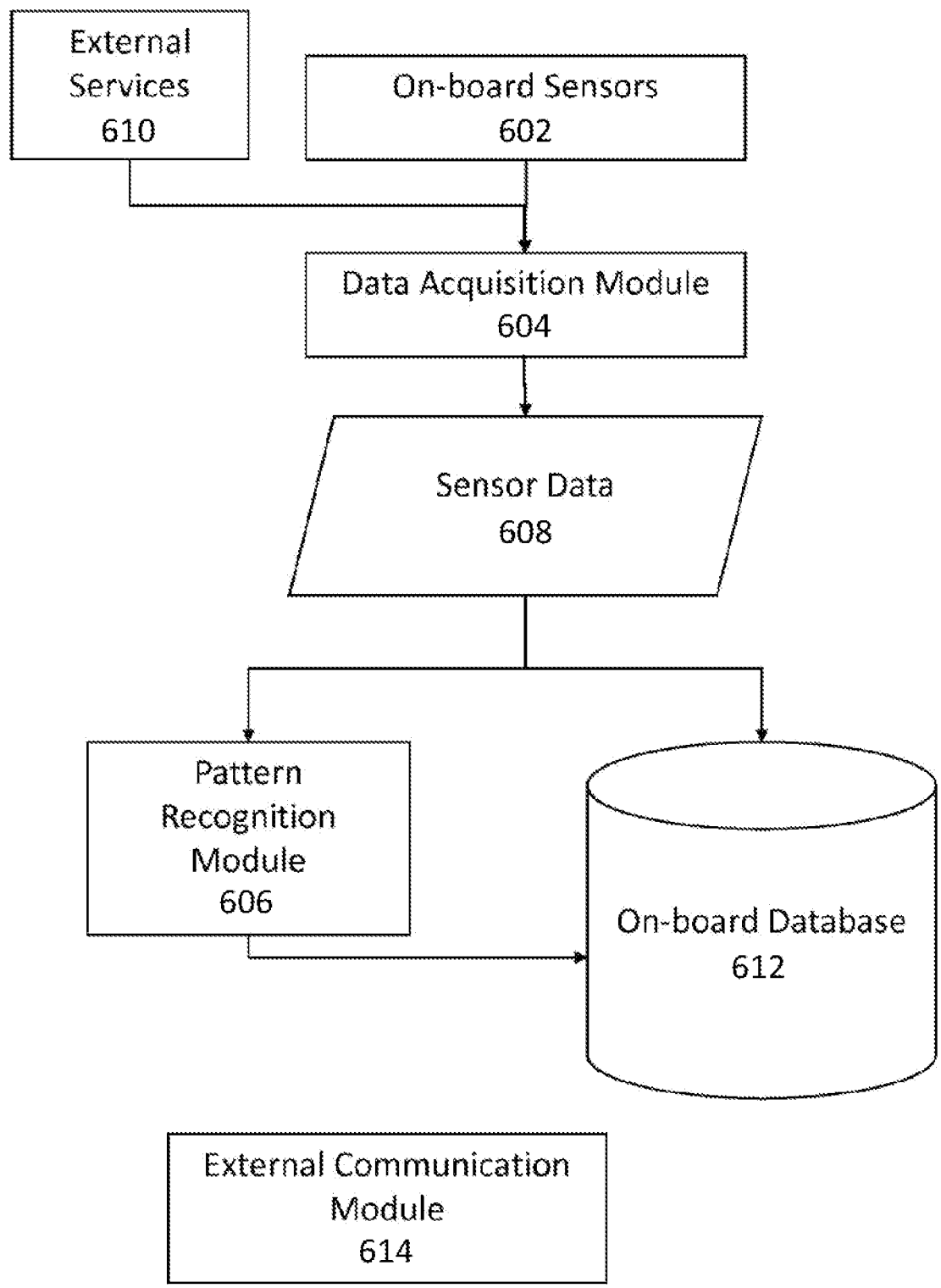
FIG. 6 illustrates a vehicle on-board system for acquiring, analyzing and transmitting on-board sensor data.

Both the vehicle on-board database and the central database comprise one of more of the data below. The on-board database may be vehicle specific and may only contain pertinent information to the vehicle in question. The following list comprises information that may be stored:
  Collections of sensor data acquired during accident events along with a unique ID for each event
  Weather, traffic and road conditions data for each accident event
  Insurance company profiles and communication protocols
  Vehicle specific information including parts and options
  Associated parts and services required for specific types of accident damage and injuries that may be incurred
  Accident Patterns specific to the vehicle (relationship between sensor output and accident detection)
  Damage Patterns specific to the vehicle (relationship between sensors output and type and severity of damage and parts that may need to be replaced)
  Injury Patterns specific to the vehicle (relationship between sensors output and type and severity of damage and emergency services and treatments that may be required.)
  Driver Behavior Patterns generic to a group of drivers and indicative of good and bad driver Characteristics
  Repair facility information relative to both the vehicle type and insurance carrier
  Towing services relative to both the vehicle type and the insurance carrier
  Contact information for:
    Insurance Adjuster
    Local Emergency Dispatch
    Part Carriers
    Auto Body and Auto Repair Providers
  Cross correlation information of parts for each vehicle with the same parts in other vehicles
  Geographic parts availability
  Location of medical treatment facilities and their capabilities
  Digital Map of the area or areas of interest for georeferencing accident events and relationship to driving risk On-Board Vehicle System FIG. 6 illustrates an embodiment of the components on-board a vehicle utilized to acquire sensor data, analyze that sensor data indicative of vehicle action and driver behavior. The system can be provided all or in part as a portable device (e.g., a smartphone, a tablet computer, computer, or other portable device).

The overall system comprises vehicle on-board systems for many vehicles and one or more central processor/s and data repository/s.

A vehicle on-board system FIG. 6 comprises several functionalities that can be implemented as individual components that communicate with one another via wireless or wired connections or a single or few components with modules implemented in software or firmware. The components can be permanently installed in a vehicle or be a mobile device that can be used in more than one vehicle or a combination of components that are both permanently installed and removable. Likewise sensors can be integral to the vehicle or added on or part of another device that resides in the vehicle or any combination.

In an embodiment some or all of the following functions occur in the vehicle on-board system:
  Continuously monitoring of sensors occurring a data acquisition module 604
  Acquiring external information via wireless communication from external services 610 off-vehicle
  In a pattern recognition module 606, matching sensor output or derivatives of sensor output
  To patterns that are indicative of an accident event that has occurred and/or patterns that can be used to predict resulting damage and/or injury associated with an accident events
  Matching sensor output or derivatives of sensor output to patterns that are indicative of driver behavior
  Store sensor data and analysis for defined time periods in an onboard database 612.
  Store damage/injury assessment and/or raw sensor data pertaining to the accident in an onboard database 612
  If wireless communication is available using an external communication module 614 after an accident event, submit preconfigured damage/injury assessment reports; send out prefigured requests for services and supplies based on the assessed damage/injury
  After an accident, send out or make available a listing of patterns that were observed based on the sensor data and/or the raw sensor data recorded during the event to a central database repository
  Make damage/injury analysis available for on-scene participants via short range wireless or wired connection
  Optionally display the results of the accident analysis on an infotainment screen within the vehicle or on a screen of a mobile device (not shown in FIG. 6)

As shown in FIG. 6, the vehicle on-board hardware and/or software implementation components to achieve the above tasks are:
  On-board Sensors 602 (Data Collection Devices)
  A data acquisition module 604
  Pattern recognition module 606 for accident detection and damage/injury assessment
  On-board Database 612 containing:
    Sensor data 608
    Patterns (not shown)
  Communication module 614 used between on-board systems and components and/or external server's and services The on-board sensors 602 comprise one or more of:
  GPS
  Air bag deployment indicator
  Accelerometers
  Gyroscope
  Seatbelt fastened indicator
  Number of passengers (sensors in seats)
  Ambient Temperature
  Tire pressure
  Engine Oxygen Sensors
  Engine Temperature
  RPMs
  Vehicle Speed
  Exterior Temperature
  Humidity
  Dew Point
  Video Cameras External Services 610 that are monitored comprise one or more of:
  Weather
  Road Conditions
  Traffic A pattern recognition module 606 is configured with one or more defined operating patterns, each of which operating patterns reflects either a known change in vehicle status, or a known vehicle operating or driving behavior. For example, a vehicle responds in a physically-measurable manner to driver-based driving actions, e.g., by the driver turning the vehicle sharply at a corner. An accelerometer can be similarly used to register the sudden deceleration or impact of a collision, and its direction. This enables the system to associate patterns with certain vehicle status or operations, or with historical records for a particular vehicle or for similar vehicles.

Vehicle On-Board Database

Individual vehicle on-board databases 612 may be a subset of the central database having specific information for a make, model or class of vehicle. In an embodiment, information is also specific to the geographic area the vehicle is in. In an embodiment, to create a vehicle on-board database, a query, based on the Vehicle Identification Number (VIN) of the vehicle, is made to the central database that allows selection of only pertinent data. In an embodiment, the list of equipment that is part of a vehicle can be modified to account for aftermarket replacement parts (for example a new sound system). Depending on communications system that is implemented within the vehicle and the bandwidth available, location specific information can be periodically updated based on the actual location of the vehicle (based on GPS or other location measurements while the vehicle is moving) or based on a route plan in a navigation system.

As part of the vehicle on-board database for a given vehicle, relationships referred to as accident patterns and damage and injury and driver behavior patterns are stored. These patterns relate sequences of sensors reading or calculations based on sensor readings and information about the vehicle to accident detection. Damage patterns relate sensors reading and vehicle specific information to a damage assessment. Injury patterns relate sensors reading and vehicle specific information to assessment of driver and passenger injury. Driver patterns relate to driver safe operation of a vehicle.

In embodiments, there is a listing of parts associated with types and location of impacts. There is a cross correlation of parts number associated the vehicle in question and other vehicles that use the same part. For example the front fender of a 1993 Ford Taurus is the same for 1994 Mercury Sable but may have a different part number.

There can be a listing of type of injuries associated with type and location of impacts and where passengers are sitting and additional information such as if the passenger is in a baby seat.

All vehicles are different: they have different options, they are exposed to different road conditions, and weather, they are used for different purposes, they are maintained differently and they are driven more or less frequently and have different drivers and most importantly, they have different weights. All of these factors can contribute to how much an insurance claim will be for any accident and also how quickly the vehicle can be repaired or an injury treated. In addition any of these pieces of information can also give clues to whether a resulting claim is wholly or partly fraudulent. For example, for a front end collision of a new vehicle, it should not be necessary to repaint the trunk, because the paint is not faded, and it would be easy to match the existing paint. If a car has a side impact airbag, and the car is impacted on the side, then injuries will potentially be far less than if the airbag was not available. However the damage estimate will be far greater due to the airbag deployment.

Addition information that may be recorded on-board a vehicle and included with an accident report and/or added to the on-board vehicle database could be the following car history items:
  Number of vehicle trips and where for a given time interval
  Number of accidents reported in last day/week/month/year
  Number of risky driving events reported in last day/week/month/year
  Number of speeding events reported in last day/week/month/year Building the Initial Central Database Patterns must be established that enable: the detection of an accident occurrence from onboard sensor data; assessment of the type and severity of damage/injury in a vehicle accident; and for driving behavior. In addition the data is used to relate areas and times to the hazard of driving a given road segment. The central database, in an embodiment, is initially created from historic records concerning accidents such as police accident reports and insurance adjuster on-site reports. These type of reports typically would not have on-board sensor data associated with an accident, but rather would have a written description of damage and the location of damage. As the patterns for detection of an accident event, for damage assessment and for injury assessment are designed to be relative to sensor data and no sensor data may be initially available, then a transfer function or correlation between the verbal description in accident reports and anticipated sensor response needs to be made.

An accident report may document that there was an impact to a right front fender when another vehicle collided with the subject vehicle. It might further be documented that the subject vehicle was stationary and the colliding vehicle was moving at 20 kph (12 mph). If the right front fender was damaged, but not the front bumper, an angle of impact of 45 degrees from the long axis of the vehicle might be inferred. The angle of impact could also be inferred from images of the damage that are taken at the accident scene.

As sensors measure physical parameters, then verbal descriptions and inferences from accident reports must be translated into a physical units to derive the accident, damage and injury patterns based initially on accident reports, but later to be based on sensor output. For example, given the relative speed of impact (velocity of impacting vehicle and the velocity of the impacted vehicle—for head on collision), and the weight of each vehicle, force of impact can be calculated. Given the force and direction of impact, then the maximum acceleration on impact (that would be detected by an accelerometer on a vehicle) could be approximately calculated. If the accident reports are standardized, then descriptions of accident specifics could be read electronically (if the report is in digital format) or by searching for keywords (if paper reports are optically character recognized).

Information about repairs made or injuries treated, most likely come from reports other than the police accident report—usually from the insurance carrier or directly from repair services and medical services.

Alternatively, an initial accident detection pattern could simply be the observation that an airbag has deployed.

Information amassed from historical records that are desirable to input into the central database are:
  Impact zone (where impact occurs on the vehicle)
  Impact magnitude and direction (usually inferred from accelerometer readings) Location (geographic)
  Vehicle Type and age (and from the Vehicle Identification Number (VIN), what options did the car come with)
  Any custom modification to the vehicle (mag wheels, aftermarket sound/entertainment system)
  The availability of parts within the vicinity of the accident
  Who, where and how quickly was the auto fixed
  Listing of OEM or other parts used for the fix.
  Speed, direction of travel
  Single car collision, multiple car collision; relative speed, speed of the other vehicle
  Brakes on? ABS engaged; airbags deployed
  Pictures and/or video of the accident
  Surveillance camera footage
  Insurance pay-out.
  Emergency Responder and onsite treatment received
  Transport to what hospital facilities
  Number of passengers, where they were sitting and extent of injuries
  Erratic driving behavior prior to the accident for the driver To build the initial database, some or all of the following need to be performed:
  Identify historic sources of accident information such as police reports, insurance adjuster reports, repair bills, parts require, vehicle specifics preferably in some type of digital form such as JSON or XML
  Design a database and standardize units and numerical ranges between datasets; map and enter into a database and cross correlate the information to particular vehicle specifications
  Create a means to document, quantify, and locate damage to a vehicle (for example create zones on the vehicle and identify any impact damage that falls within a zone
  Design and Create metadata for entries into the database
  Identify relationship between damage and cost to fix the damage, to indicators of the extent of damage from the historical data base/s
  Map historical information to a map database of the transportation network It should be noted that the database could be a collection of remote databases that are linked and indexed together. So information about vehicle specifics could be in one database in Detroit, while accident event information could be in one of several other databases in other locations.

Sensor Data Collection, Pattern Detection and Accident Remediation

New data is collected from vehicle on-board sensors and from external feeds continually, in an embodiment. At given time intervals the data for the last time period is stored and the older data is thrown out. Alternatively the data is stored in a memory stack of a set size where new data is added to top of the stack and the oldest data (at the bottom of the stack) is thrown out. At intervals which could correspond to the sample interval or multiples of the sampling rate, an accident patterns is looked for. If an accident patterns is detected, indicating an accident has occurred during the time interval, then the sampling rate may be increased to acquire more data per time period, and/or other sensor data, previously not being recorded, may be recorded.

The end of the accident event, in an embodiment, is defined when the vehicle is stationary. Once the accident is over, the stored data is analyzed to detect damage and injury patterns. Analysis is performed and if accident and/or injury patterns are detected, then the location and estimated damage and injury associated with these patterns is recorded.

If the severity of injury anticipated by the analysis is sufficient, then an ambulance and/or paramedic is contacted (provided communication is available). If a tow is needed, then a tow vehicle is called, provided the local information for such services is available. An insurance adjuster is contacted. Parts and repair services are queried to check availability. Depending on the configuration, information about the accident is displayed on an infotainment screen in the vehicle or on an authorized portable device.

The raw data and/or the sensor analysis is transferred to a server via the communication network (wireless, or otherwise) for inclusion into the central database and for future determination of accident, damage and injury patterns.

Figure 7:
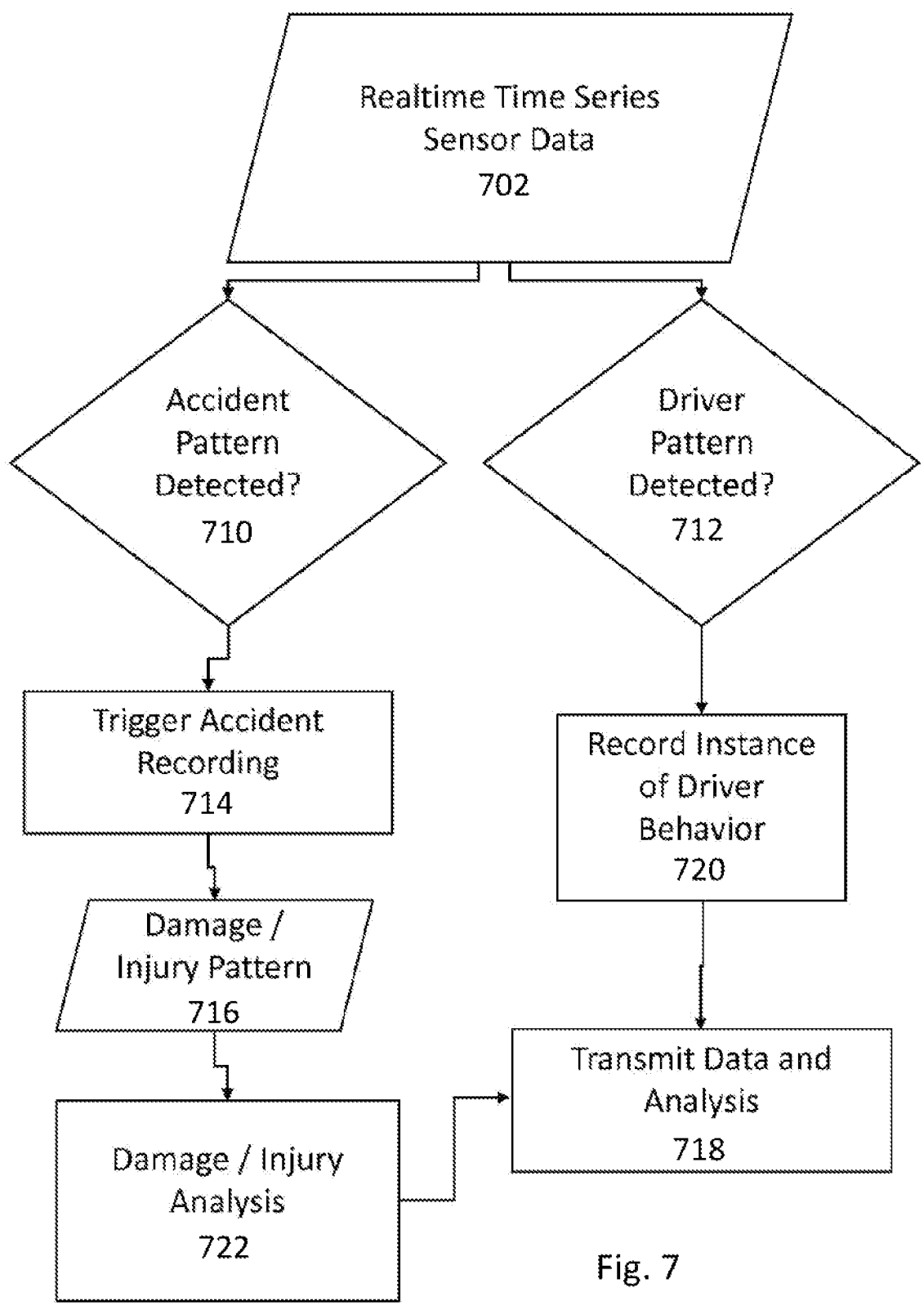
FIG. 7 illustrates the process of pattern detection in sensor data.

FIG. 7 illustrates and embodiment of a vehicle on-board system. Realtime time series data is acquired from many sensor on-board the vehicle 702. At intervals, the analysis software is comparing the sensor data feeds to either an accident pattern 710 or a driver pattern 712 in search of a correlation. If an accident pattern is detected this triggers recording of detail information 714 and a search for damage and injury patterns within the data 716. If a pattern is detected, then analysis is performed concerning the extent of damage or injury and the location of damage or injury 722 and this information along with the underlying data is transmitted to interested parties 718.

If a driver pattern is detected 712, an instance of the pattern is recorded 720 for later transmission 718 to, for example an insurance company, for analysis.

Determination of Accident, Damage and Injury Patterns

Patterns are the vehicle on-board sensor output and other external environmental information observed during an accident. Patterns may be expressed as polynomial equation; they may be a threshold constant or upper and lower range for a specific sensor; they may be based on frequency and/or amplitude analysis of a single type or multiple types of sensors or they could be a statistical mean value for one or more sensor outputs or environmental factors. Patterns will change over time as more data is added, more sophisticated analysis is performed or more sensor types are available for on-board measurement. Patterns for one type of vehicle may be entirely different than for another type of vehicle. This may be due to different sensor suites being available or different physical attributes of the vehicle.

When starting a program for estimating accident damage and injury using patterns, patterns can be inferred from historic accident reports and/or vehicle on-board sensor data.

In an embodiment, if all or part of input for accident detection, damage and injury assessment comes from accident reports, these data may need to be parameterized in such a way as they can be used into a numeric model. An example of parameterization would be to characterize incidents into a grouping. For example, it may be desirable to collectively refer to impact force based on accelerometer readings in ranges in units of meters/second rather than actual values or as a mean over a time frame.

The following tasks comprise steps to determine patterns initially based on accident reports:

Develop a relationship between geographic location, the zone on the vehicle where the damage occurred and severity of impact and other inputs, to the cost of repair and likelihood that certain parts will have to be replaced. Also develop a relationship to severity and location of an impact and other vehicle specific inputs, to the likelihood of injury to passengers.

Develop transfer functions between observation in historical databases built from accident reports to onboard sensor measurements that are indicative of the observations. For example, an accident impact could be inferred when a rapid deceleration is detected either by accelerometer measurements or change in speed measurements. Location, and relative speed of an impact can be inferred based on 3 component acceleration. Alternatively a side impact can be inferred when a side airbag is deployed.

Test the transfer function by predicting vehicle damage and resulting cost based on sensor data after an accident. Confirm the prediction based on conventional accident and insurance adjustor reports.

Reline the transfer functions as necessary to increase statistical reliability.

Gradually incorporate sensor measurements and create a more granular predictive models based solely on sensor measurements (without inference from historical data not from sensors). In the initial database collisions may be classified based on relative speed of impact, for example. With more accurate speed data from sensors and vehicle weights, the classification could be changed to an impact momentum in N/m2 using liner ranges for classification rather than simply an approximate relative speed of collision.

It may be desirable to limit the data/parameters that are utilized and make some simplifying assumptions.

Accident detection patterns could be inferred simply by knowing the weight of the car and inferring a maximum acceleration or change in momentum that would indicate an accident occurred. Damage and Injury patterns are approximated by relating specific accident descriptions to ranges of acceleration or momentum and the direction of impact. Once accidents are categorized as to the location and severity of damage in terms of anticipated range of acceleration that occurred during an event, then a cross correlation between repairs and injury treatments required for a given vehicle type can be made with the each range of acceleration.

Insurance/Driving Risk Prediction

Figure 8:
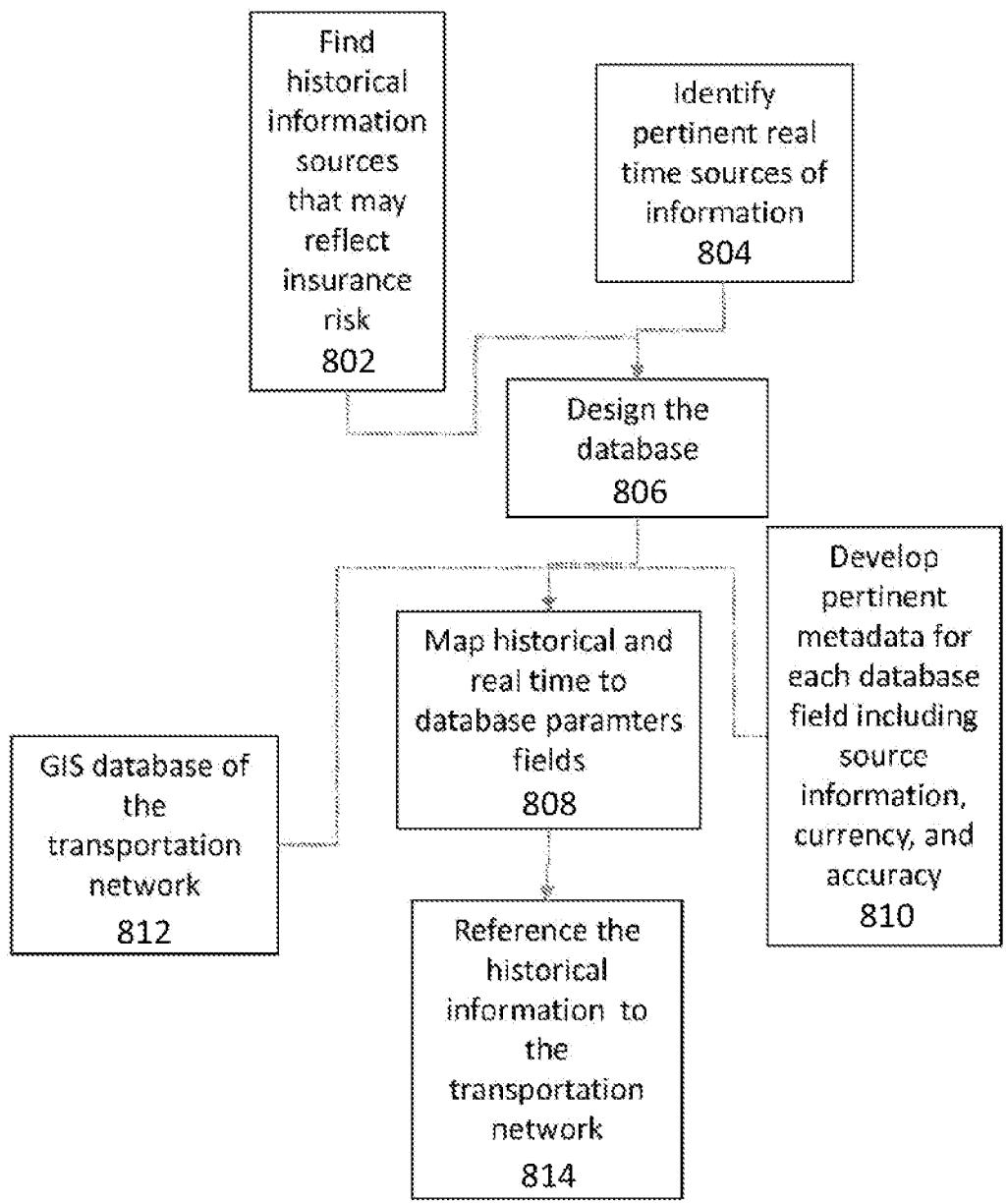
FIG. 8 illustrates a method of determining insurance risk.

FIG. 8 shows one method of how to initially construct a spatially referenced database, to be used to predict insurance risk or risk of driving along a particular route or along certain transportation segments during a given time of day or time of week, based on existing historical information. A database of historical information is needed in order to determine baseline insurance premiums or risk and also to determine what type of information is available that may be relevant to insurance risk or driving risk. The development of the database assumes no strong correlation between any parameter and risk. For example an individual may consistently drive over the speed limit, but yet still be a safe driver—therefore, at least on an individual level, fast driving may not have a strong relationship to insurance risk, however as a whole, drivers in general may be a larger risk if they drive fast.

It is not presumed that relationships between parameters and risk hold true over large areas—there may be locally relevant predictors that are not as significant as in other areas. Certain historical datasets or parameters may not be as readily available in some areas as they are in others. For example, reports documenting accidents and accident locations may be more readily available and more easily input into a database for an urban area than for a rural area. Or accident reports may not be available, but traffic counts which may indicate accidents may be available.

Ideally the attribution used for insurance rating will be easier to deal with if it is consistent throughout the entire rating area. To accommodate this, it may be necessary to approximate a parameter stored in the database with input from a related parameter. For example, from the previous paragraph, you may wish to store accident occurrences associated with each road segment. If accident reports are not available for an area of interest but traffic flow information is, you may be able to infer that while traffic stops or slows way down that this is caused by an accident. This could then be reflected as an accident occurrence. This inferred accident occurrence could further be reflected in the metadata as the source for the accident count and an indication that the count is less reliable than an actual accident count. Another means of getting the proxy is the road quality, like road maintenance, and quality of the road surface type.

Accordingly as shown in FIG. 8, the first step 802 is to find sources of historical information that potentially can be used singly or in tandem with other parameters to predict insurance and driving risk. As pointed out above, the sources of information may vary locally, but it will be necessary to combine or map 806 the information from different sources that represent the same parameter into a single database field.

Any model or predictive function could be greatly influenced by information that is acquired in real-time or near real time from drivers. This information could comprise things such as speed of travel, braking, engine function, acceleration, route taken and many others. If this information is readily available, it will influence the design of the predictive database. Therefore sources of pertinent real time information need to be identified 804.

Based on what historical information that is available and what quantity there is and what type of real time information can be acquired, the database schema or design can then be created 808. All parameters to be stored in the database will be geographically referenced 814 with respect to an underlying GIS database 812 of the transportation network. Certain parameter (for example a speed limit) may also be temporally referenced.

Once a rating system is running based on the database, some of the data in the database may be retired based on age or when more accurate information becomes available. Therefore metadata about the age and quality of the data needs to be documented 810.

FIG. 8 shows an example of how disparate information is combined into a single layer in the risk database. The example is given for accident reports but the technique also applies to any type of attribution. As accident reports initially come from local police departments and/or directly from insurers, the format of the information and availability varies between departments or companies. For example, one department will have available accident reports that are geographically referenced to a street address or an intersection 802 and another department will have accident reports referenced to geographic coordinates 806, for example, latitude and longitude. In an embodiment of this invention, risk attribution is referenced to components of the transportation network, for example street segments or intersections, with possibly also direction of travel. Therefore the frame of reference of the incoming accident reports need to be translated into the frame of reference of the database. For accident reports geographically referenced to a street address or intersection 802, the reference must be geocoded 804 so that the segment or intersection can be associated (snapped) 808 with appropriate road segment or intersection in the database. If the incoming accident report is referenced to map coordinates 806, then this location can simply be snapped 808 to the nearest street segment or intersection.

As is well known, the probability of an accident will increase with increased traffic density and/or due to inclement weather. This information may be available 810 with incoming accident reports or may be available via other sources such from a weather service which then can be related to an accident incident via location and time.

The probably of an accident may increase based on the time. For example the probability of an accident most likely increases at 2 AM (2:00) on New Year's day as opposed to any other day at the same time. Therefore any form of attribution that can be associated with an incident should be added 812 so that it can be analyzed to see if there is any correlation with risk.

The granularity of associated information will vary. For example if a traffic flow was associated with a particular accident and that traffic flow information was acquired from a Traffic Messaging Channel (TMC), this information may not be associated with the exact location of the accident and therefore may be suspect. The quality of the associated attribution for accident reports needs to be documented as metadata 814.

It should be noted that initially accident reports (and other parameters) would come from historical data such as police reports, however, this could be supplanted by real time information coming from vehicle sensors. For example, if an insurance subscriber allowed access to the insurer for output from car sensors, an accident incident could be recorded at the gps location of the vehicle when there was signal indicating that the air-bag was deployed. Once again the source of the report or parameter should be included as part of the metadata and be used as a measure of quality. Other driving telemetry obtaining devices which may be installed on the vehicle (perhaps at the behest of the insurance company) would be used to obtain additional pertinent information.

In accordance with an embodiment, the system can incorporate or utilize additional functionality as further described in U.S. Patent Application titled "SYSTEM AND METHOD FOR USE OF PATTERN RECOGNITION IN ASSESSING OR MONITORING VEHICLE STATUS OR OPERATOR DRIVING BEHAVIOR"; application Ser. No. 13/679,722, filed Nov. 16, 2012, herein incorporated by reference.

Distributed Database Synchronization

In an embodiment the vehicle on-board database is specific to that vehicle. In order to keep this data current and geographically relevant, periodic syncing of the on-board vehicle database needs to occur with the central database repository.

Syncing of the vehicle on-board database with the central database needs to occur:

During initialization of the on-board vehicle database
When process control software needs to be updated
When new accident detection patterns or damage estimation patterns are available
When vehicle equipment is modified
When the vehicle moves out of a specified geographic area or when a trip is planned
When the insurance carrier is changed As part of both the vehicle on-board database and central database there is metadata associated with the currency of the data. Upon update to new currency of data, the metadata is also changed to reflect the update. Currency metadata is associated with all data structures. If there was only a single currency on an entire vehicle on-board database, then if an upload of new currency data failed mid-stream, the entire upload would have to be re-implemented.

The following occurs during a data currency upload. The vehicle communication module establishes communication with a central server or visa-versa. The vehicle identifies itself to the server. The server then checks for flags associated with the identified vehicle indicating whether an update was in progress previously that did not finish. If there was an unfinished update, the records of transaction IDs for database entries that were successfully updated are retrieved to determine where the upload needs to resume. The upload resumes until all new elements are updated.

After a update has completed or if a new one is desired, then the server performs a query to determine all pieces of information that have changed since the last update and assigns transaction IDs to each database replace or insert operation that needs to happen. The query to determine what updates need to be performed are based on the date of the last successful complete update (or associated metadata), the vehicle VIN number and any alterations to the vehicle systems and the location and/or destination of the vehicle. Geographic information may be overwritten or simply added to the database depending on how much on-board storage is available. Update of geographically referenced data such as the location and contact information of approved repair establishments, occurs when the GPS or other location sensor on-board the vehicle determines the vehicle is out of a zone where this information is already stored. Alternatively, the information could be stored previous to a trip being planned.

Detail of an Accident Detection and Assessment Embodiment

The following is an embodiment of how an accident is identified and damage and injury are assessed. A single 3 component accelerometer is used as the sole sensor for accident detection, damage and injury assessment. The weight of the vehicle is known. The acceleration of the vehicle is measured continuously, for example, at a frequency of 100 Hz. Acceleration measurements at each sampling interval are placed on top of the memory stack. After every sampling period, using the last successive acceleration measurements over a preset time interval and the vehicle weight, a running mean force vector and a mean force duration (impulse or momentum change) and a peak force vector are calculated.

The accident detection pattern is defined as either when the peak-force exceeds a preset threshold or the amplitude of the mean-force vector exceeds a threshold value for a set amount of time. If one of these conditions occurs, then an accident is declared in progress. The thresholds for force and duration are configurable based on type of vehicle and weight of vehicle and historical information. If the same threshold were used for a many ton tractor trailer and a 1.5 ton smart car, you would get many false positive accident detection events for the tractor trailer.

At the end of the accident event, damage assessment occurs by comparing how much the thresholds were exceeded and the directionality of the force vector and comparison to historical records that indicate costs and parts and potential injuries and treatment costs associated with this type of force/duration and direction (this is the damage and injury assessment parameter).

The raw data is uploaded to the central database and once actual figures for repair are input into the central database, this information becomes part of the historical database and the accident and damage patterns can be refined based on this new input.

Sample Notification of Accident Occurrence

In an embodiment an accident report is referred to as the The First Notice of Loss (FNOL) would consist one or more of the following parameters:

Policy number of vehicle insurance
ID of any hardware system involved in acquiring information or processing the information
Version number of data acquisition and analysis software
Data and time of accident including time zone
Location of accident [latitude, longitude, altitude]
Direction of travel (compass direction)
Velocity of vehicle prior to accident (include speed limit for the road as optional value to be added/or when not available as unknown value)
Road type (use map road classification value
Vehicle information
Make; Model; Year;
VIN (Unit can read VIN from vehicle if exposed in OBD; TOMS TDR file provide policy and vehicle details including the VIN)
Odometer reading
Ignition state (values: ON/OFF)
Driver identification
Accident severity category (force of impact)
Accident impact information (incident angle of impact, car zones affected In embodiments where a communication connection is lost, the vehicle on-board processor could send an accident report directly via SMS.

Examples are shown below of incidents that can be recorded in a risk database (part of a central database) and which can subsequently be used to determine driving/insurance risk. Examples of associated attribution are also provided. These are examples only and is not an exhaustive list.

Accidents
Crime
Tickets
Vandalism
Insurance Payout; Fault (victim or perpetrator)
Road Condition (Potholes, pavement temperature, lane marking, etc.)
Road Surface Type
Traffic Counts
Weather Events (Ice, Snow, Rain, Fog, Smog, Temperature)
Driver Distracted? Also visibility of curves, signs, traffic lights, warning signals
Traffic Flow
Volume of Traffic
Speed of Traffic/Excess Speed
Lane Closures Detours Related Accidents The following list are examples of information that may be recorded for an individual driver and may come from either/or questionnaires or real-time sensor information:

Type of car; where you drive; when you drive; snow tires during winter; previous tickets Real-time tracking allowed by the vehicle driver?

GPS, bluetooth usage (i.e., cellphone); rapid acceleration; braking; airbag deploy; speed; other driving telemetry devices installed in car (accelerometer, gyroscope, compass)

Air Bag Deployment

Rapid Acceleration/Deceleration

Swerving from lane

Segments and intersections traversed including time of day; time of week; speed; braking; acceleration; lane changes; crossing the median; bluetooth usage Stopping locations; duration Associated weather Once a historical database of incidents, for example, accidents and traffic violations is developed and referenced to transportation elements, then analysis can be performed to determine relationships to risk. Once again, no a priori assumptions are made about a correlation between a particular parameter and risk other than initial assumptions that are made to run and test a multivariate model.

In an embodiment, incidents are evaluated based on the quantity and quality of information available and also the extent over which the information is available. The goal is to create a risk index or indices based on one or more of the type of incidents recorded related to elements of the transportation network.

In an embodiment, what is desired, is a function to predict the likelihood that a given driver will make an insurance claim and for how much. The likelihood of claims and cost of those claims can be a function of:

Time

Location (for driving and parking)

Driver Performance

Road Conditions

Weather

Traffic Volume

Crime Statistics

Type of Vehicle

Number of passengers

Vehicle condition

These parameter can be further broken down into:

Time: time of day, time of week, time of year, holidays; daylight/nighttime

Location: relative to a transportation segment, geographic location, within a political boundary If monitored with car sensors (where a vehicle is left overnight; where and when it is driven);

Driver Performance:

If monitored using sensors while driving: amount of distraction (mobile use); driving above or below speed limits; weaving; rapid acceleration; road class usage; and duration From records: accident reports; speeding and other violations Road Conditions:

From records: potholes, sanding/salting during storms; plowing frequency; number of police patrols; visibility issues (like proper lighting at night, or blinding sun in eyes)

From vehicle sensors: bumpiness; storm conditions; ABS braking engaged; differential slip The factors that may influence the number and amount of insurance claims may be exceedingly complex. This is why the analysis lends itself to a form of multivariate analysis. Typically a human can only visualize the relationship between 2 maybe 3 variables at a time and a parameter my not be directly related to a cause of an incident, but may provide an indication of the cause. For example in one area, it may be found that the instance of traffic accidents at 2 AM is far greater than in another area. Therefore you could conclude that time of night is not a very good overall predictor of having an accident. However if you also observe that in the first area, the instance of arrest for drunk and disorderly is higher than the second area, the combination of time and arrests for intoxication, may be a much better predictor. If yet more variables are introduced, then the relationship may get more complicated and more poorly understood without some form of multivariate statistical correlation.

In another example the quality of the information will influence the predictive model. It is well known that ice formation on a road is a function of temperature, humidity and barometric pressure. However if the weather conditions in an accident report are based on the general weather conditions for the region from a weather report, this data will not take into account, subtle weather variations that may be available from in-car sensors. A difference of a degree in temperature could make the difference between ice and no ice.

Figure 9:
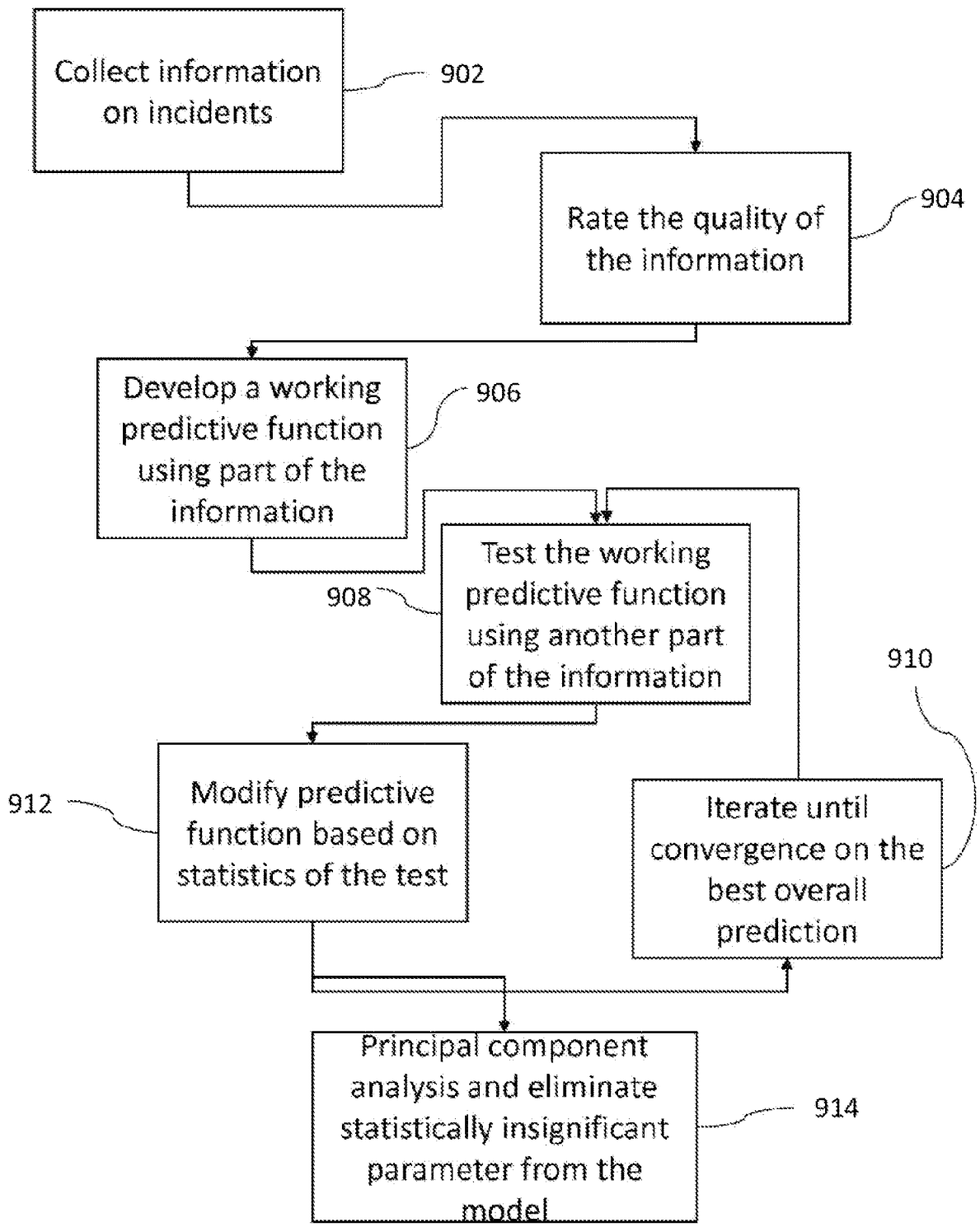
FIG. 9 illustrates a method of determining models or patterns.

As shown in FIG. 9, once an initial database is constructed 902 with some or all of the above listed information, then a predictive model (patterns) needs to be developed. When collecting data, care must be taken to not duplicate the same incident that is recorded in multiple sources. A statistical significance of the measurement parameters needs to be evaluated with respect to insurance risk 904. For a given geographic area, it must be ascertained whether or not there is enough data to make a meaningful correlation and whether that data is of sufficient quality. If the data is of mixed quality, as in the freezing pavement example above, then quality must be taken into account for the overall general model. This can be done by setting a minimum threshold data quality where a dataset must contain quality data for a specified percentage of the transportation elements within the region of interest.

It is desirable to have as much granularity in the observed information as possible in order to determine what information correlates more strongly to risk. Using the accident report example, we want to predict insurance risk. Therefore, for all the accidents that occur in a region, if we have information on the insurance pay-out, a model can be developed that uses part of the information is a training set 906, for example in a neural network predictive model known in the art and part of the data to test the prediction 908.

In many multivariate analysis methods, initial assumptions need to be made to come up with a working predictive function 906. For example, initial weighting or correlation values might need to be assigned to the input variables. An educated guess may be that the number of pot holes in a road is about half as important to risk as the number of drunk driving arrests.

Once an initial model is generated, an iterative process 910 is used to converge on a reasonable predictive model. This is done by modifying the weighting of input parameters slightly 912, then rerunning the new predictive function and observing the correlation statistics until an optimal correlation is arrived at.

In an embodiment, the input for a model may need to be parameterized in such a way as it can be used into a model. An example of parameterization would be to characterize incidents into a grouping. For example, it may be desirable to collectively refer to accidents counts falling into a range of 1-10 accidents per year as a "low" accident count and have "medium" and "high" counts as well.

As was previously pointed out, the parameters that could be used to predict insurance or driving risk and the resulting model could be exceedingly complex. Compiling information from a variety of sources to populate a given parameter may be difficult and if available data is insufficient, may also result in a poor prediction. Therefore, in order to keep the cost of the insurance rating or driving risk system low and to facilitate rapid development, it may be desirable to limit the data/parameters that are utilized and make some simplifying assumptions.

In an embodiment, the assumption is made that insurance or driving risk for driving on a particular transportation element is directly correlated to the number of accidents reported on that element over a set time period. Therefore the risk database could simply contain accident incidents that are related to individual transportation segments. If available, additional attribution that may be recorded with accident incidents are, for example, direction of travel, time of day, date, and weather variables. In this embodiment, it is further assumed that insured drivers have agreed to have their driving habits monitored. If the person is applying for insurance, an initial insurance premium could be based partially on the area of residence and some average of accident risk within a geographic radius of the residence. Alternatively or after an initial rate is applied, the weekly habits (or longer duration) of the driver could be monitored. By monitoring when and where the driver has been, then, for example, it could be determined all the transportation elements the driver has traversed for a given rating interval and how many times they have been traversed.

Figure 10:
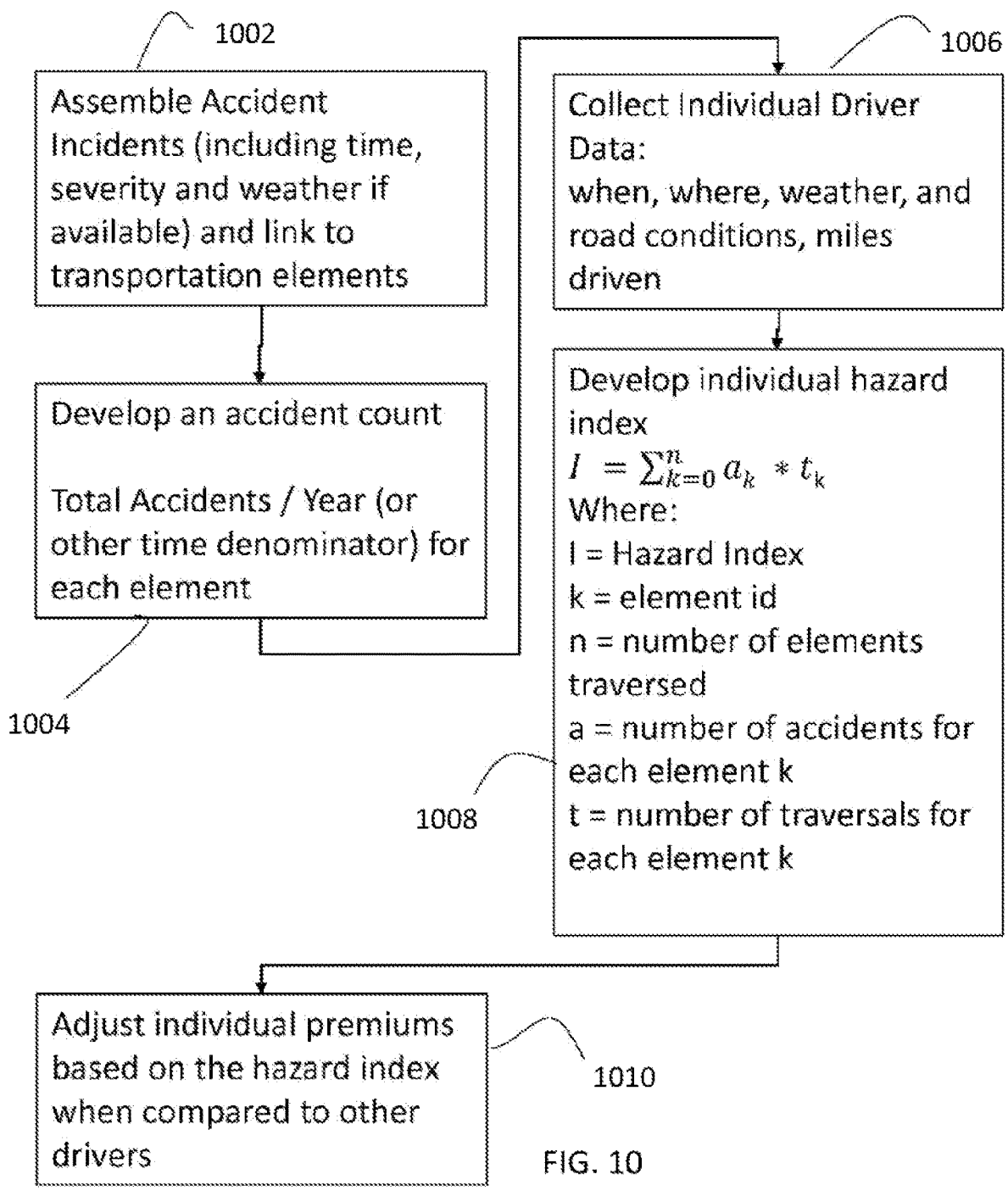
FIG. 10 illustrates a method for generating a hazard index.

As shown in FIG. 10, this embodiment would comprise assembling an accident incident database and linking accidents incidents to transportation elements 1002. If any additional information is available such as the time of accident, the severity of the accident, the weather or pavement conditions, this should be included as associated attribution. Based on the incident information, an accident count could then be developed 1004 which in its simplest form would be the average number of accidents that occur on each transportation element over a given time period. If other attribution is available, then the accident count could be further subdivided based by separating data, for example, for a given time of day or time of week, thus having multiple accident counts per transportation element. If severity information was available, then accident incidents could be weighted in the accident count, for example, an accident with a fatality could be counted as 10 times a minor accident.

To determine an insurance premium based on the above accident counts, then the risk associated with an individuals driving habits needs to be assessed. The can be done by collection of data while an individual is driving 1006. Data to be collected comprises when and where a person is driving and then relating that information to the transportation elements a person drives on and the frequency they drive on them. From this information, a basic Hazard Index (1) can be developed 1008. In its simplest form, the Hazard Index is the summation of the accident count for all elements traversed multiplied by the number of traversals for a given time period. Finally insurance premiums could be adjusted based on the individual Hazard Index when compared to other individuals.

Yet more refinement of an individual Hazard Index could be made by further subdividing the index based on additional attribution such as weather and road conditions provided that the accident count database has this amount of granularity.

As more drivers are monitored, gradually, historical data gleaned from accident reports could be replaced by, for example, air bag deployments sensor information from insured drivers. The air bag deployment could be related to accident occurrence and severity and would make it unnecessary to acquire accident information from other sources such as accident reports from the police.

In an embodiment of the present invention, once a database of insurance or driving risk is established and maintained with current information, then commercial risk products can be created that map the associated driving risk to transportation elements, for example in a geographic information (GIS) system. This product can be sold to municipalities and other entities responsible for safety on transportation networks and provided to driver so they know what the risk of driving a particular route is.

Influence Driving Behavior

Yet another embodiment of the present invention is a method to reduce driver/insurance risk utilizing one of the above described risk and driver habit databases and monitoring of a driver activities and habits in real-time. The system utilizes a navigation device located in a vehicle. The navigation device is either in communication with a risk database and a driving habits database or the databases are stored within the navigation device. The navigation device can be integral to the vehicle, a stand-alone device or software implemented on a computer, smartphone or tablet device. Generally location is determined by a GPS which is part of the navigation device. Based on former analysis and part of the driver habits database, the system pre-determines routes that the driver in question has historically taken. It further determines the propensity of the driver to deviate from safe driving habits such as driving faster than the speed limit or swerving in the other lane or using a mobile phone (as determined from blue-tooth usage for example).

Figure 11:
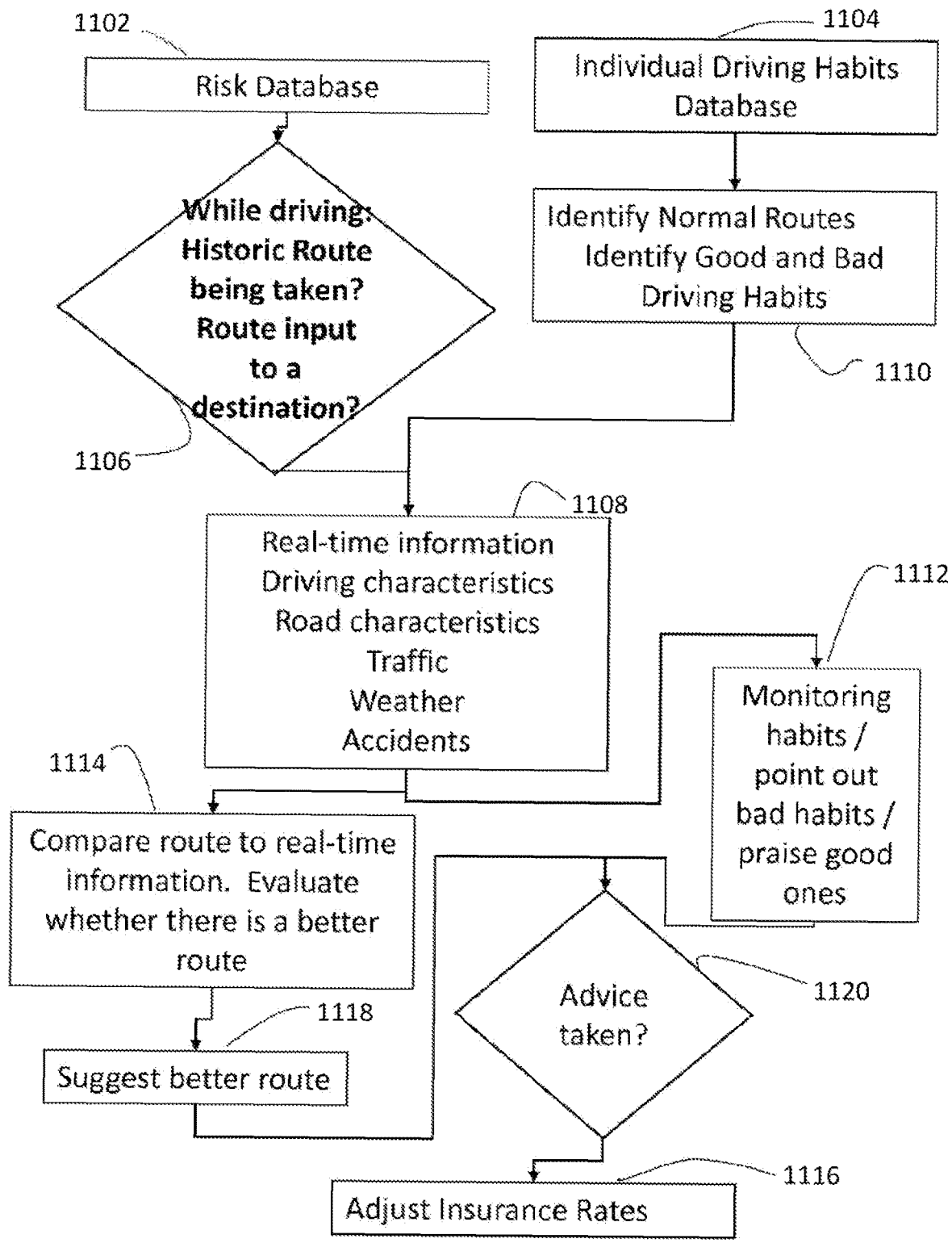
FIG. 11 is a flowchart for using a system to adjust insurance rates based on risk

As shown in FIG. 11, starting with the risk database 1102 and the driving habits database 1104, when a driver starts driving, the system determines whether the driver is driving a historical route, for example, driving towards work at a given time of day, or alternatively if a driver has input a route 1106 to a new destination. If a route is being taken, the system next looks for real-time information from external sources of information 1108—for example traffic counts, accident reports or reports of lane closures. In addition, weather information along the route could also be acquired. Next, the travel time and risk assessment along the anticipated route is calculated by the navigation device. Alternate routes are also calculated taking into account the real-time information. If an alternate route is found that is safer and/or faster 1114, then this information can be displayed to the driver and a selection can be presented to route via the safer or faster route 1118. If the safer route is selected 1120, then the navigation system can either add an indication into the driver habit database, that the advice was taken or this can be transmitted to a server where insurance rates are determined. This information can then be used to affect insurance rates 1116.

In addition, deviations from safer driving habits are monitored during driving 1112. If a bad driving habit are detected—say, for example, exceeding the speed limit—advice can be displayed to slow down. If the advice is taken, then this information can be treated as in the above safe route scenario 1116.

Road Hazard Mapping

Figure 12:
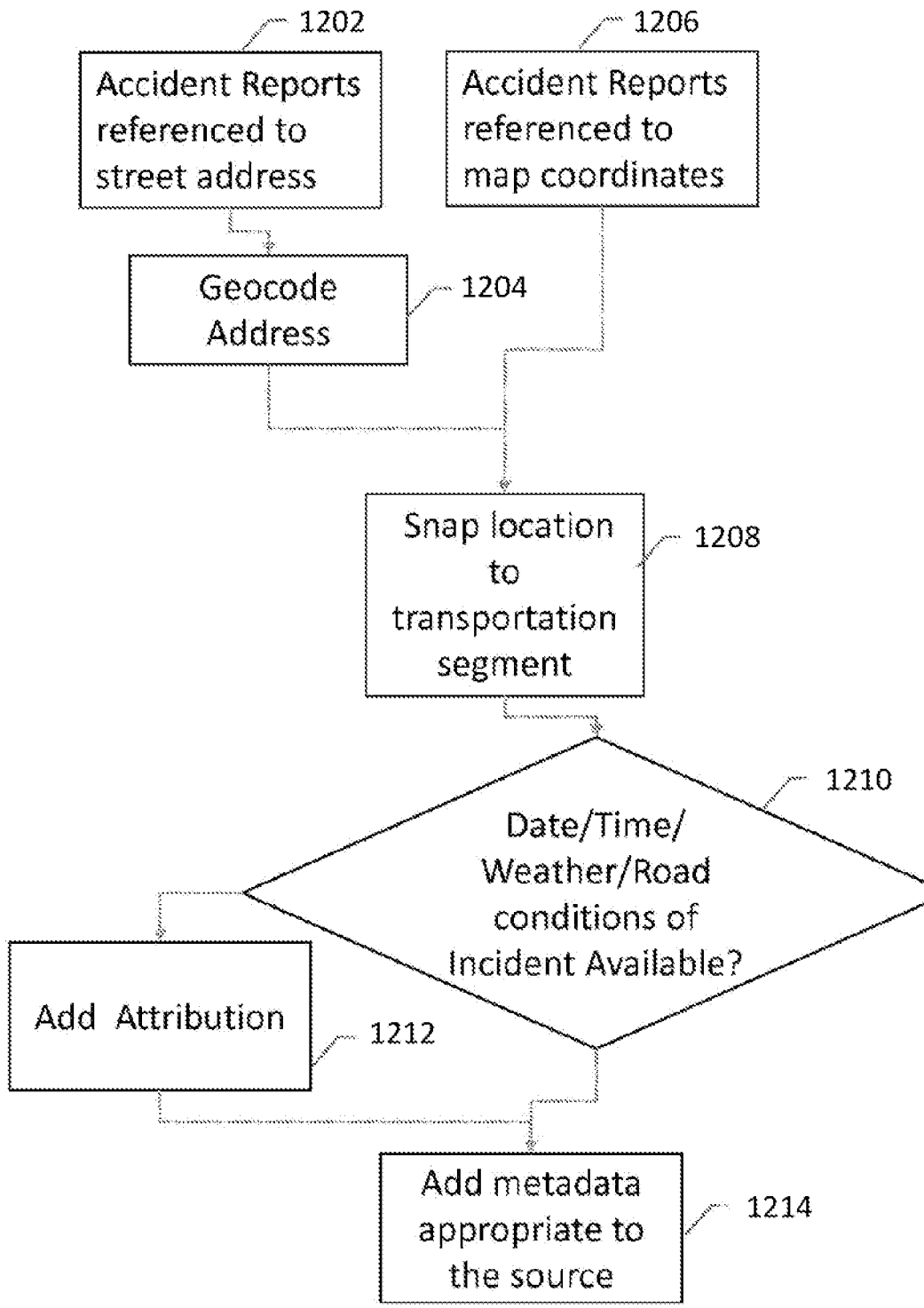
FIG. 12 is a flowchart showing compilation of georeferenced hazard information.

FIG. 12 depicts an embodiment of the present invention showing compilation of geo-referenced hazard information which can subsequently be displayed to vehicle drivers or which can be viewed on a map view showing transportation routes. Accident reports are compiled that are referenced to street addresses 1202 or to map coordinates 1206. For the accident reports referenced to streets 1202, the addresses are geocoded to get a location in map coordinates 1220. Located accident reports are then associated with a transportation segment such as a road segment or intersection 1208. Any associated environmental conditions are added to the database which are referenced to the time and place of the accident 1210. Any pertinent additional data is also associated with the accident 1212. Finally metadata with respect to the quality of information is added to be used to remove outdated or poor quality data as more and better accident information comes it.

Methods of Implementation

The present invention may be conveniently implemented using one or more conventional general purpose or specialized digital computers or microprocessors programmed according to the teachings of the present disclosure, or a portable device (e.g., a smartphone, tablet computer, computer or other device), equipped with a data collection and assessment environment, including one or more data collection devices (e.g., accelerometers, GPS) or where the portable device are connected to the data collection devices that are remote to the portable device, that are connected via wired or wireless means. Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAM5, flash memory devices, magnetic or optical cards, nanosystems (including molecular memory ICs), or any type of media or device suitable for storing instructions and/or data.

Remarks

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. For example, although the illustrations provided herein primarily describe embodiments using vehicles, it will be evident that the techniques described herein can be similarly used with, e.g., trains, ships, airplanes, containers, or other moving equipment, and with other types of data collection devices. It is intended that the scope of the invention be defined by the following claims and their equivalence.

What is claimed is:

1. A vehicular system with automated self-identification and determination of accident occurrence, accident damage and repair estimation, comprising:
    a vehicle capable of moving material or people along a transportation network;
    one or more sensors mounted in said vehicle configured to collect vehicle status information indicating at least accelerations acting on the vehicle during a timeframe encompassing an accident in which the vehicle is involved;
    a transceiver mounted in said vehicle and configured to transmit the collected information and derivatives of the collected information;
    a database containing (i) vehicle specific information including at least vehicle type, (ii) historical accident information for vehicles of the same type comprising accident types, accident severity and acceleration patterns from accidents correlated with the stored accident types and severities, said patterns reflecting (a) strength of impacts for accidents of different types and severities; (b) one or more zones of the vehicle on which the impact occurred for accidents of different types and severities, and (c) direction of impact acting on the vehicle for accidents of different types and severities, (iii) historical information on vehicle parts replaced and repaired associated with different accident types and severities stored in the database; and
    an accident review module comprising a processor and memory configured to receive said vehicle status information from said transceiver disposed in the vehicle and to execute a pattern recognition-based predictive model stored in said memory after receiving said status information to automatedly determine:
        occurrence of an accident based on pattern recognition using comparison of at least the received vehicle status information indicating accelerations occurring during said timeframe with the stored accident acceleration patterns in the database, and with respect to a determined occurrence of an accident further determine:
            an estimation of the strength of the impact based on pattern recognition using comparison of said accelerations occurring during said timeframe with the acceleration patterns contained in the database indicating strengths of impacts,
            an estimation of the zone of the vehicle on which the impact occurred based on pattern recognition using comparison of said accelerations occurring during said timeframe with acceleration patterns contained in the database indicating zones of impacts, and
            an estimation of the direction of the impact acting on the vehicle based on pattern recognition using comparison of said accelerations occurring during said timeframe with acceleration patterns contained in the database directions of impacts;
        accident type and severity based on comparison of estimated strength, zone and direction of impact with impact strength, zone and direction correlated to accident type and severity in the database; and
        a damage and repair estimate based on comparison of the determined accident type and severity to the historical information on vehicle parts replaced and repaired associated with different accident types and severities stored in the database.

2. The system of claim 1, further comprising:
a repair parts database which has cross-referenced entries including:
   location of each part;
   applicable vehicles;
   availability of each part; and
   cost of each part;
wherein an estimate is generated for time and cost of repair based on the identified type and severity of the accident and the availability of parts in the vicinity of the accident.

3. The system of claim 1, wherein the in-vehicle transceiver is configured to receive accident damage and repair information, including at least said accident damage and repair estimate from the accident review module.

4. The system of claim 3, further comprising a display screen disposed in the vehicle wherein the accident damage and repair information received by the in-vehicle transceiver are displayable to a user in the vehicle.

5. The system of claim 1, wherein the database comprises an on-board database disposed on the vehicle.

6. The system of claim 1, wherein the database comprises information collected from at least one of sensors external to the vehicle, web services, and other observations external to the vehicle.

7. The system of claim 1, wherein the database is continually updated by at least one of:
   adding newer accident data;
   removing data from older accidents;
   replacing more qualitative data with more quantitative data;
   replacing manually entered data with sensor data and sensor derived information;
   updating the predictive models based on the new data; and
   updating metadata associated with the quality of input data and the predictive model.

8. The system of claim 1, wherein the accident review module is located in the vehicle.

9. The system of claim 1, wherein the accident review module is located remote to the vehicle.

10. The system of claim 1, wherein said database further containing cross-referenced entries for one or more of:
   vehicle unique identification number,
   vehicle equipment configuration,
   location of prior accidents,
   time of prior accidents,
   materials needed for repairs,
   labor costs and material costs to effect repairs, and
   sensor data and derivative products of sensor data recorded for each accident.

11. An automated system for vehicle accident damage and repair estimation independent of human on-scene inputs, comprising:
a communication channel configured to receive information derived from one or more in-vehicle sensors, said in-vehicle sensors configured to collect at least information indicating accelerations experienced by the vehicle during a timeframe encompassing an accident;
a database containing (i) vehicle specific information including at least vehicle type, (ii) historical accident information for vehicles of the same type comprising accident types, accident severity and acceleration patterns from accidents correlated with the stored accident types and severities, said patterns reflecting (a) strength of impacts for accidents of different types and severities; (b) one or more zones of the vehicle on which the impact occurred for accidents of different types and severities, and (c) direction of impact acting on the vehicle for accidents of different types and severities, (iii) historical information on vehicle parts replaced and repaired associated with different accident types and severities stored in the database; and
an accident review module comprising a processor and memory configured to receive said vehicle status information from said transceiver disposed in the vehicle and to execute a pattern recognition-based predictive model stored in said memory after receiving said status information to automatedly determine:
   occurrence of an accident based on pattern recognition using comparison of at least the received vehicle status information indicating accelerations occurring during said timeframe with the stored accident acceleration patterns in the database, and with respect to a determined occurrence of an accident further determine:
      an estimation of the strength of the impact based on pattern recognition using comparison of said accelerations occurring during said timeframe with the acceleration patterns contained in the database indicating strengths of impacts,
      an estimation of the zone of the vehicle on which the impact occurred based on pattern recognition using comparison of said accelerations occurring during said timeframe with acceleration patterns contained in the database indicating zones of impacts, and
      an estimation of the direction of the impact acting on the vehicle based on pattern recognition using comparison of said accelerations occurring during said timeframe with acceleration patterns contained in the database directions of impacts;
   accident type and severity based on comparison of estimated strength, zone and direction of impact with impact strength, zone and direction correlated to accident type and severity in the database; and
   a damage and repair estimate based on comparison of the determined accident type and severity to the historical information on vehicle parts replaced and repaired associated with different accident types and severities stored in the database.

12. The automated system according to claim 11, wherein:
the database further contains cross-referenced entries for one or more of:
   vehicle condition;
   vehicle age;
   vehicle unique identification number,
   vehicle equipment configuration,
   location of prior accidents,
   time of prior accidents,
   materials needed for repairs, and
   labor costs and material costs to effect repairs.

13. The automated system of claim 11, wherein said sensors comprise a data collection module configured to be mounted in a vehicle.

14. The automated system of claim 11, wherein said communications channel comprises an in-vehicle transceiver capable of transmitting at least one of the collected information and derivatives of the collected information to the accident review module that is external to the vehicle.

15. The automated system of claim 11, further comprising:

a repair parts database which has cross-referenced entries including:
  location of each part;
  applicable vehicles;
  availability of each part; and
  cost of each part;
wherein an estimate is generated for time and cost of repair based on the identified type and severity of the accident and the availability of parts in the vicinity of the accident.

16. The automated system of claim 14, further comprising:
a vehicle configured to move material or people along a transportation network; and
a data collection module mounted in said vehicle, wherein the data collection module comprises at least said in-vehicle transceiver.

17. The automated system of claim 16, wherein said data collection module further comprises one or more of said sensors disposed in said vehicle.

18. The automated system of claim 16, wherein the data collection module is further capable of receiving accident damage and repair information from the accident review module and includes an in-vehicle display screen wherein the accident damage and repair information received by data collection module are displayable on the display screen.

19. The automated system of claim 11, wherein the accident review module comprises an application on a mobile device operated by an on-scene individual at the accident.

20. The automated system of claim 11, wherein the historical accident database comprises information compiled from a plurality of historical accident reports, and said pattern recognition-based predictive model comprises a neural network predictive model.

21. The automated system of claim 20, wherein the historical database further comprises information compiled from in-vehicle sensors measurements for a plurality of accidents and derivatives thereof.

22. The automated system of claim 11, wherein the accident review module is located remote from said vehicle and said communication channel comprises a wireless communications network.

23. The automated system of claim 11, wherein the accident review module is located in said vehicle and said communication channel comprises a wired connection.

24. The automated system of claim 11, wherein additional information is collected from at least one of sensors external to the vehicle, web services, and other observations extremal to the vehicle and said additional information is input to the predictive model.

25. The automated system of claim 11, wherein the historical database further comprises information collected from at least one of sensors extremal to the vehicle, web services, and other observations external to the vehicle.

26. The automated system of claim 11, wherein the historical accident database is continually updated by at least one of:
  adding newer accident data;
  removing data from older accidents;
  replacing more qualitative data with more quantitative data;
  replacing manually entered data with sensor data and sensor derived information;
  updating the predictive models based on the new data; and
  updating metadata associated with the quality of input data and the predictive model.

27. A non-transitory computer readable medium, including instructions stored thereon which when read and executed by one or more computer processors cause the one or more computer processors to perform the steps of:
  implement a data collection module within a vehicle configured to collect information about an accident including at least information indicating accelerations acting on a vehicle during an accident;
  implement an accident database, said accident database containing (i) vehicle specific information including at least vehicle type, (ii) historical accident information for vehicles of the same type comprising accident types, accident severity and acceleration patterns from accidents correlated with the stored accident types and severities, said patterns reflecting (a) strength of impacts for accidents of different types and severities; (b) one or more zones of the vehicle on which the impact occurred for accidents of different types and severities, and (c) direction of impact acting on the vehicle for accidents of different types and severities, (iii) historical information on vehicle parts replaced and repaired associated with different accident types and severities stored in the database;
  implement an accident review module containing a pattern recognition-based predictive model, said accident review module configured to receive said vehicle status information from said transceiver disposed in the vehicle and execute the predictive model after receiving said status information to automatedly determine:
    occurrence of an accident based on pattern recognition using comparison of at least the received vehicle status information indicating accelerations occurring during said timeframe with the stored accident acceleration patterns n the database, and with respect to a determined occurrence of an accident further determine:
      an estimation of the strength of the impact based on pattern recognition using comparison of said accelerations occurring during said timeframe with the acceleration patterns contained in the database indicating strengths of impacts,
      an estimation of the zone of the vehicle on which the impact occurred based on pattern recognition using comparison of said accelerations occurring during said timeframe with acceleration patterns contained in the database indicating zones of impacts, and
      an estimation of the direction of the impact acting on the vehicle based on pattern recognition using comparison of said accelerations occurring during said timeframe with acceleration patterns contained in the database directions of impacts;
    accident type and severity based on comparison of estimated strength, zone and direction of impact with impact strength, zone and direction correlated to accident type and severity in the database; and
    a damage and repair estimate based on comparison of the determined accident type and severity to the historical information on vehicle parts replaced and repaired associated with different accident types and severities stored in the database.

28. The system of claim 10, wherein said pattern recognition-based predictive model comprises a neural network predictive model.

29. A vehicular system with automated self-identification and determination of accident occurrence, accident damage and repair estimation, comprising:

a vehicle capable of moving material or people along a transportation network;

one or more vehicle on-board sensors configured to collect vehicle status information indicating at least vehicle speed and accelerations acting on the vehicle during a timeframe encompassing an accident in which the vehicle is involved;

a vehicle on-board database containing vehicle specific information including at least vehicle type, accident patterns for the vehicle type and damage patterns for the vehicle type, said accident patterns including information reflecting (a) strength of impacts for accidents types and severities; (b) one or more zones of the vehicle on which the impact occurred for accidents types and severities, and (c) direction of impact acting on the vehicle for accident types and severities, and said damage patterns including information relating type and severity of damage and damaged parts with said accident patterns; and a pattern recognition-based predictive model automatedly determining occurrence of an accident based on comparison of the vehicle status information with said accident patterns, and with respect to a determined occurrence of an accident further determine:

accident type and severity including estimated strength, zone and direction of impact based on comparison of the vehicle status information with impact strength, zone and direction information contained within said accident patterns; and a damage and repair estimate based on comparison of the determined accident type and severity including the estimated strength, zone and direction of impact with said damage patterns.

30. The vehicular system of claim 29, further comprising a transceiver mounted in said vehicle and configured to communicate vehicle status information to a remote server and receive historical information on vehicle parts replaced and repaired associated with the vehicle type and different accident types and severities from a remote database, wherein said damage and repair estimate is further based on the received the historical information on vehicle parts replaced and repaired associated with different accident types and severities.

31. The vehicular system of claim 30, wherein the pattern recognition-based predictive model uses one of quadrant, sextant or octant slices of the vehicle to identify zone of impact and uses a relative impact rating system to identify strength of impact.

32. The vehicular system of claim 31, wherein the relative impact rating system categorizes strength of impact as one of low, moderate or extreme.

33. The vehicular system of claim 32, wherein the pattern recognition-based predictive model comprises a neural network predictive model.

\* \* \* \* \*

UNITED STATES PATENT AND TRADEMARK OFFICE
CERTIFICATE OF CORRECTION

PATENT NO. : 11,157,973 B2
APPLICATION NO. : 14/517543
DATED : October 26, 2021
INVENTOR(S) : Gil Emanuel Fuchs Page 1 of 1

It is certified that error appears in the above-identified patent and that said Letters Patent is hereby corrected as shown below:

In the Claims

In Column 37, Claim 24, Line 49, the word "extremal" should be replaced with the word "external".

In Column 37, Claim 25, Line 54, the word "extremal" should be replaced with the word "external".

In Column 38, Claim 28, Line 62, the number "10" should be replaced with the number "1".

Signed and Sealed this
Ninth Day of August, 2022

Katherine Kelly Vidal
*Director of the United States Patent and Trademark Office*